INVENTOR:
PABLO MARTIN DE JULIAN.

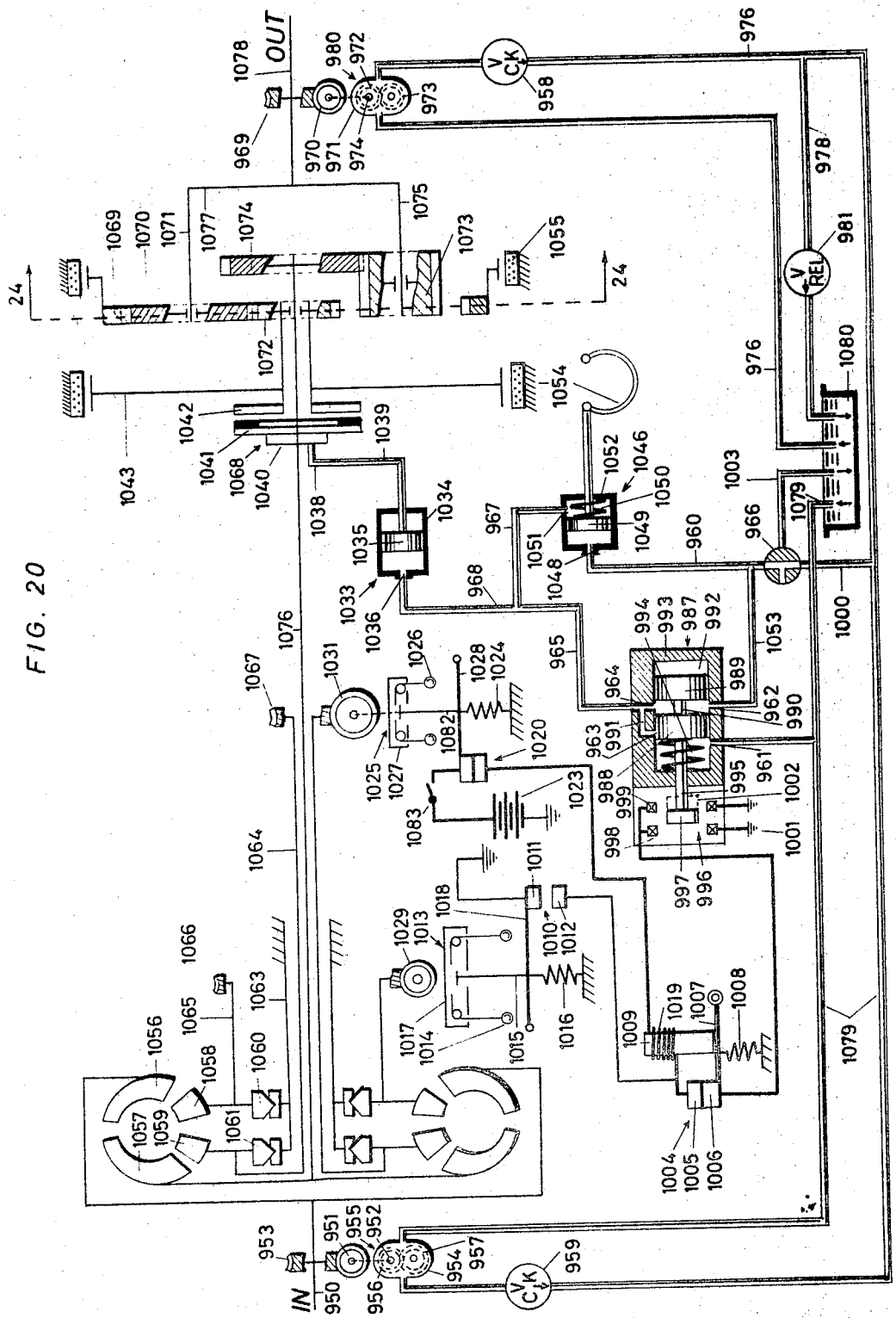

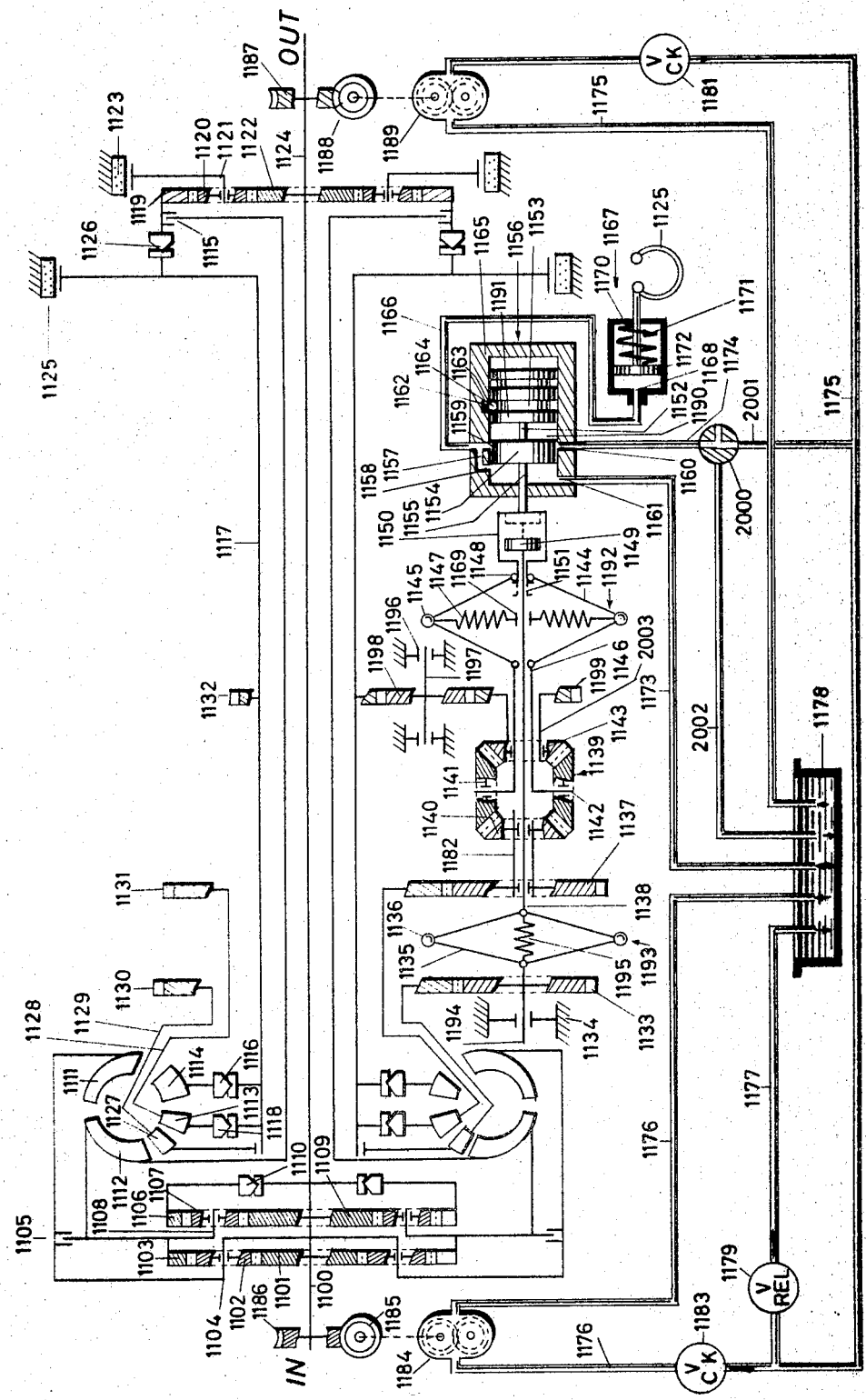

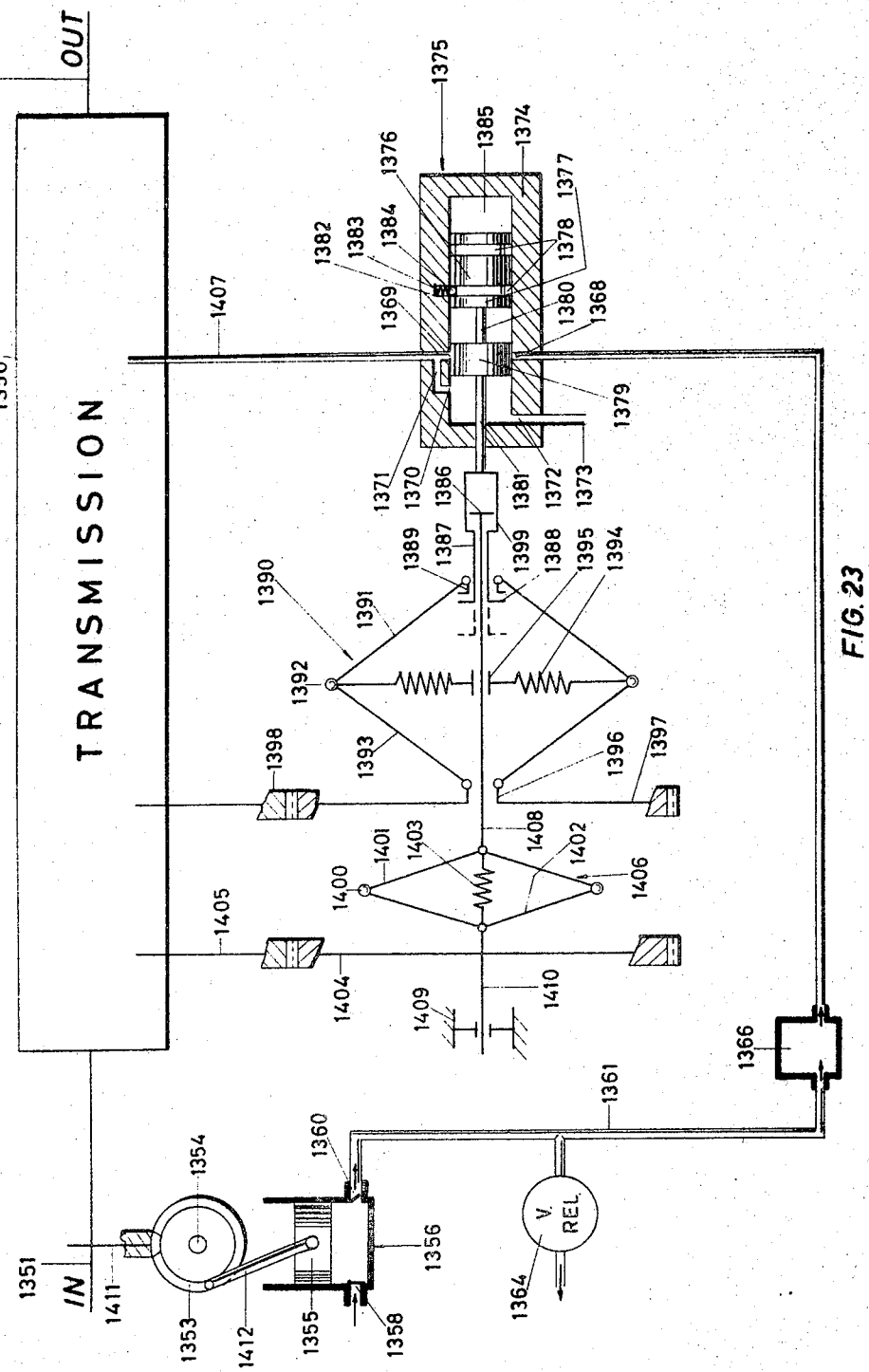

United States Patent Office 3,435,707
Patented Apr. 1, 1969

3,435,707
POWER TRANSMISSION MECHANISM
Pablo Martin de Julian, 981 Vicuna Mackenna St., Santiago, Chile
Filed Nov. 25, 1966, Ser. No. 596,836
Int. Cl. F16h 47/04
U.S. Cl. 74—677        28 Claims

ABSTRACT OF THE DISCLOSURE

A power transmission of the type wherein epicyclic gears are combined with a hydrodynamic torque converter having one or more impellers, one or more turbines, and one or more reactors. A reversing device is interposed between the driven shaft and one or more of the reactors, so that the torque forcing the reactor or reactors to rotate in reverse also acts on the driven shaft in a forward sense.

There is also provided a control system for automatically changing from low speed drive to high speed drive, and vice versa, utilizing the bladed wheel that is normally interposed between the impeller and the turbine of the hydrodynamic torque converter.

---

This invention relates to improvements in power transmission devices of the kind in which epicyclic gears are combined with a type of hydrodynamic torque converter adapted for automotive use and having one or more impellers, one or more turbines and one or more reactors.

In previously known transmissions, the reactors of a hydrodynamic torque converter are connected by means of a one-way brake to the stationary transmission housing to prevent reverse rotation of the reactors. As a result, when the turbine of the torque converter is rotating at a low speed relative to the impeller, the stationary housing delivers to the turbine wheel a torque which adds to the torque from the impeller. This torque from the stationary housing is transmitted to the reactor and then through the fluid element and the turbine wheel before acting on the driven shaft of the transmission.

The principal object of this invention is to provide an improved power transmission mechanism affording greater power efficiency, at low speeds of the input or driven shaft, than the hydrodynamic transmissions heretofore known. This objective is attained by utilizing the reactor of the hydrodynamic torque converter in a manner not heretofore known.

In the present invention, epicyclic gear trains are uniquely arranged between the reactor of the torque converter and the driven shaft of the transmission. In this arrangement, a reversing device is interposed between such reactor and the driven shaft, whereby the torque forcing the reactor to rotate in a reverse sense acts in a forward sense, on the driven shaft of the transmission.

With this arrangement, at low speeds, a greater forward torque is imparted to the driven shaft than is imparted through arrangements wherein the reactor of the converter is held stationary. This is because, in the arrangement of the present invention, the total torque delivered to the driven shaft of the transmission is the sum of the torque delivered to the reactor to prevent its reverse motion, plus another torque delivered to the driven shaft through the turbine of the hydrodynamic torque converter.

The connection commonly provided between the reactor and the driven shaft of the transmission greatly increases the output torque of the device only when the ratio of speeds between the driving and driven shafts is large. Thus, for slow rotational speeds of the driven shaft the invention provides an improvement in transmission efficiency for transmission devices in which the reactors are connected to the stationary housing by means of one-way brakes. When the ratio of speeds between the driving and driven shafts is small, the inlet angles of the reactors of the torque converter are unsuitable and will not enable the device to operate with satisfactory efficiency. For this reason, in the present invention, means are also provided to selectively disconnect the reactor of the torque converter from the driven shaft.

When the torque of the reactor directly drives the driven shaft, improved efficiency can be obtained in the hydrodynamic torque converter at the time when the reactor is freewheeling but has not yet reached direct transmission. In this case, the reactor is connected to the driven shaft through a forward change speed mechanism which causes the reactor to rotate at a speed greater than it would rotate without the use of such a connection.

Other improvements result from connecting the reactor to exert a direct drive force on the driven shaft, said direct drive force being added to the drive force exerted by the other elements that are connected to the turbine of the hydrodynamic converter.

It is also an object of the invention to provide a new control system for automatically operating engaging means which provide low and high speed forward drive power trains. This control system considers not only the load acting on the driven shaft but also the rotational speed of the driven shaft.

In a transmission including a hydrodynamic torque converter or a fluid coupling, at least one controlling bladed wheel is normally interposed between the impeller and the turbine of said hydrodynamic device. The rotational speed of the bladed wheel depends on both the speed and the load on the driven shaft. Thus, the action of the bladed wheel provides a reliable guide for determining when to automatically change from low speed drive to high speed drive, or vice versa.

With proper design of the inlet and outlet angles of the reactor, the speed power drive can be advantageously changed in accordance with a predetermined speed of rotation of the reactor.

While the automatic controlling device can be used in the operation of other change speed devices it is particularly advantageous as a control device for the transmission of the present invention.

It is a further object of the present application to provide improvements to the "Automatic and Continuous Change Speed Mechanism" disclosed in my United States Patent No. 3,241,400, issued Mar. 22, 1966. These improvements include providing the hydrodynamic torque converter with several reactors and a two stage impleller which improve the efficiency of the torque converter. The reactors are connected to one-way brakes, which can be selectively engaged or disengaged, by braking means to the stationary housing of the transmission. When the braking means are disengaged from each of the reactors, the transmission is at idle since the torque at the driven shaft is then negligible. A one-way clutch is used to couple the driving shaft of the transmission when a vehicle in which the transmission is used is moved by towing or pushing. Another clutch is used in order to attain direct gearing of the transmission.

There are shown in the accompanying drawings specific embodiments of the invention, representing what are presently regarded as the best modes of carrying out the generic concepts in actual practice. From the detailed description of these presently preferred forms of the invention, other more specific objects and features will become apparent.

Referring now to the accompanying drawings.

Figure 5:
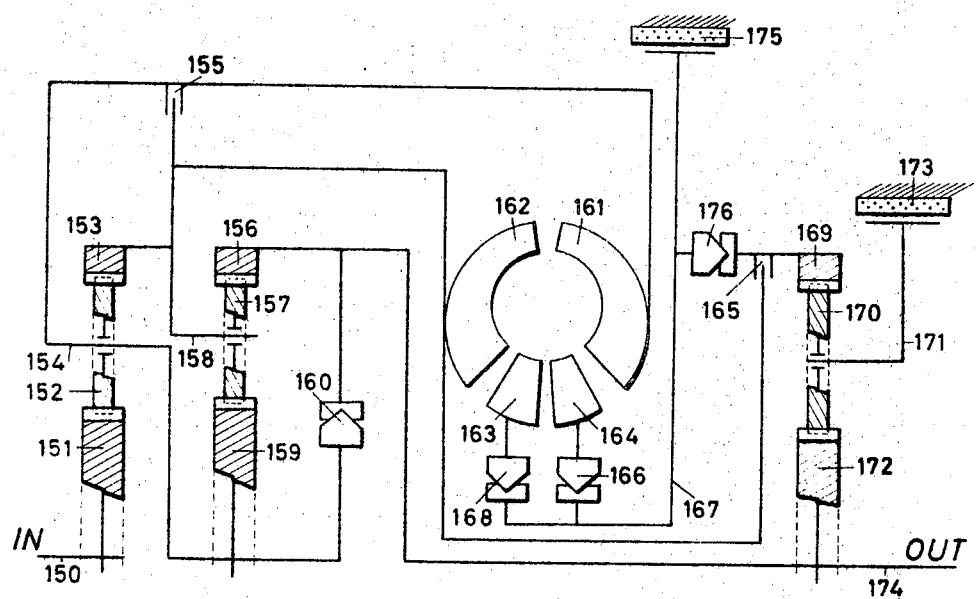
FIG. 5 is a schematic illustration of a transmission device including two trains of spur epicyclic gears connected in the same manner as is shown in FIGURE 1, and a hydrodynamic torque converter with two reactors, one of which is connected to the driven shaft through a reversing device consisting of a spur epicyclic gear train whose planet pinion carrier can be selectively braked.
Figure 6:
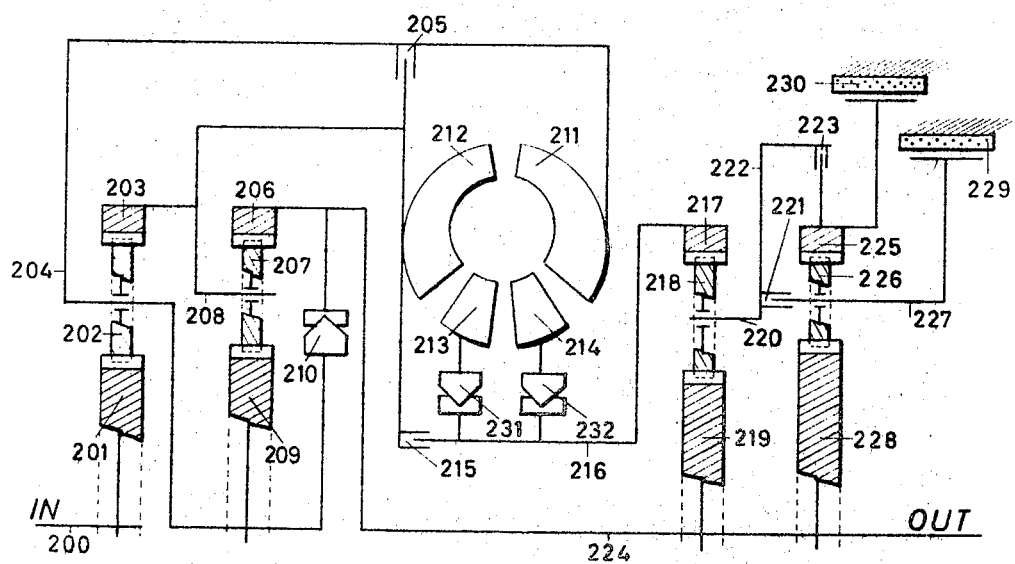

FIG. 6 is a schematic illustration of a transmission somewhat similar to the one shown in FIGURE 5. In both figures the connections between the elements of the first and second epicyclic gear trains and the hydrodynamic torque converter are the same. In FIGURE 6, however, the connections between the reactors and the driven shaft are through two reversing spur epicyclic gear trains which are connected to the driven shaft through two reversing gear trains, and which include clutching means for also obtaining a forward connection between the reactor and the driven shaft.

Figure 3:
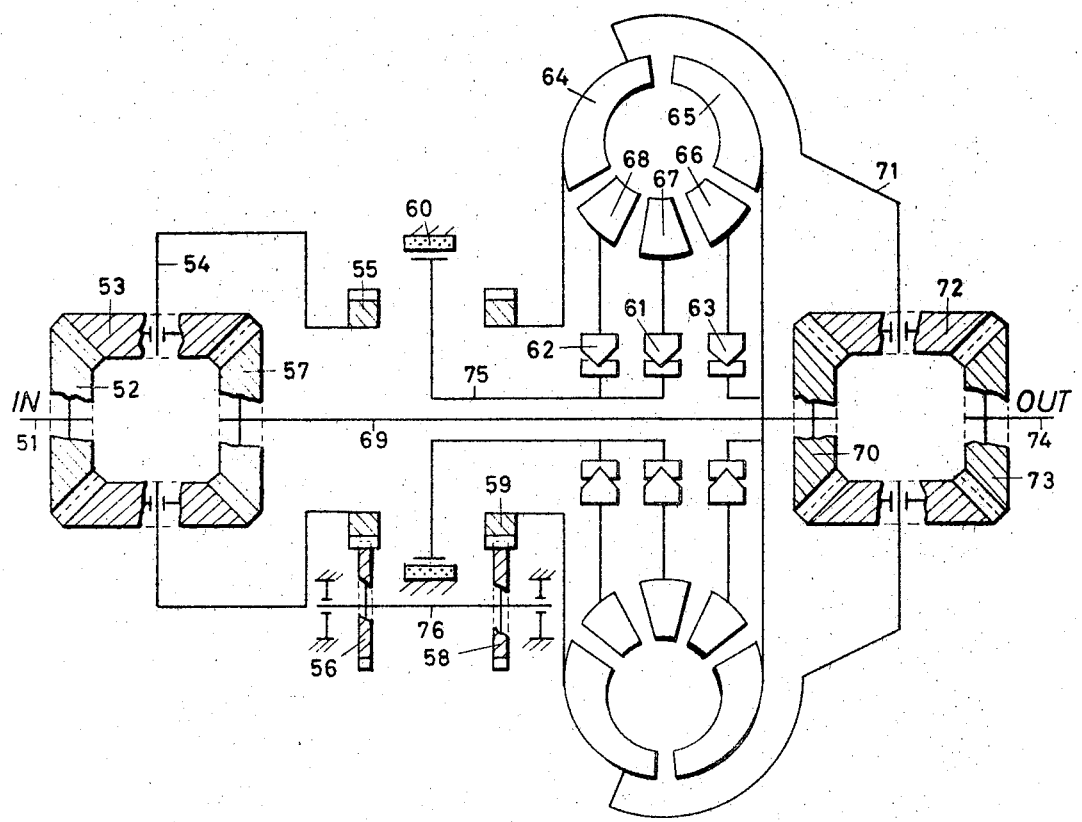
FIG. 3 is a schematic illustration of a transmission including two bevel epicyclic gear trains, an impeller with two stages, two reactors and a selective brake.
Figure 7:
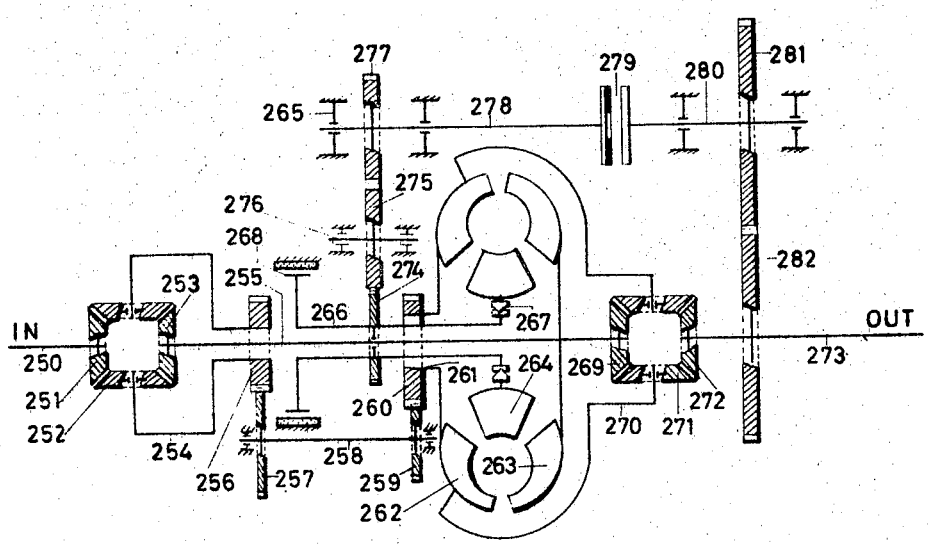

FIG. 7 is a schematic illustration of a transmission including two trains of bevel epicyclic gears connected in the same manner as the gear trains of FIGURE 3. Additionally, the hydrodynamic converter has a reactor which is selectively connected to the driven shaft by means of a reversing device consisting of a reversing gear unit not of the epicyclic type.

Figure 8:
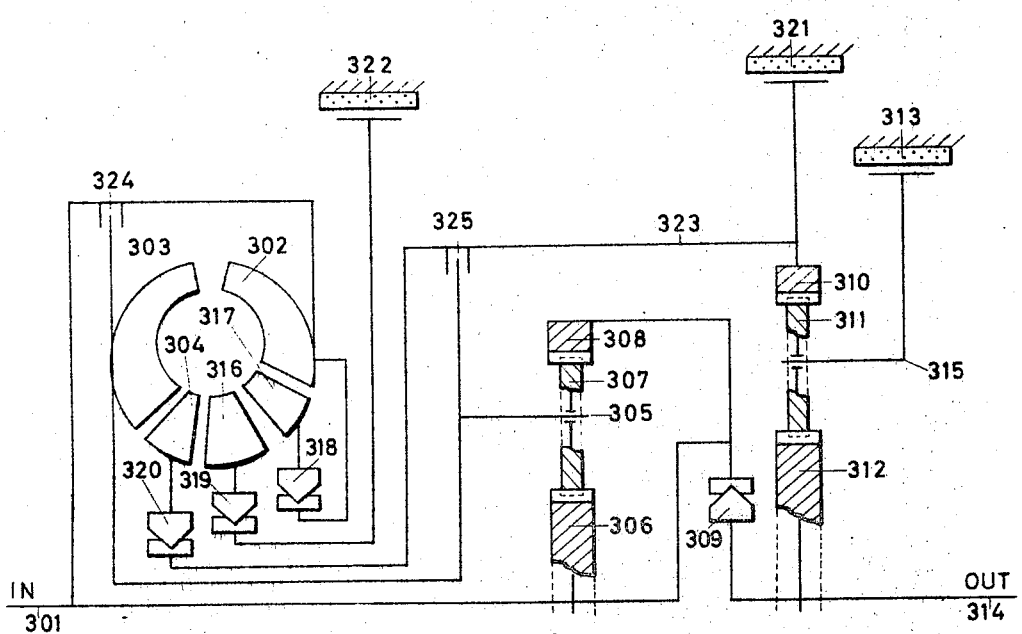

FIG. 8 is a schematic illustration of a transmission including a spur epicyclic gear train, a hydrodynamic torque converter whose first reactor is connected to the driven shaft through a reveresing epicyclic gear train. The impeller of the hydrodynamic converter has two stages.

Figure 9:
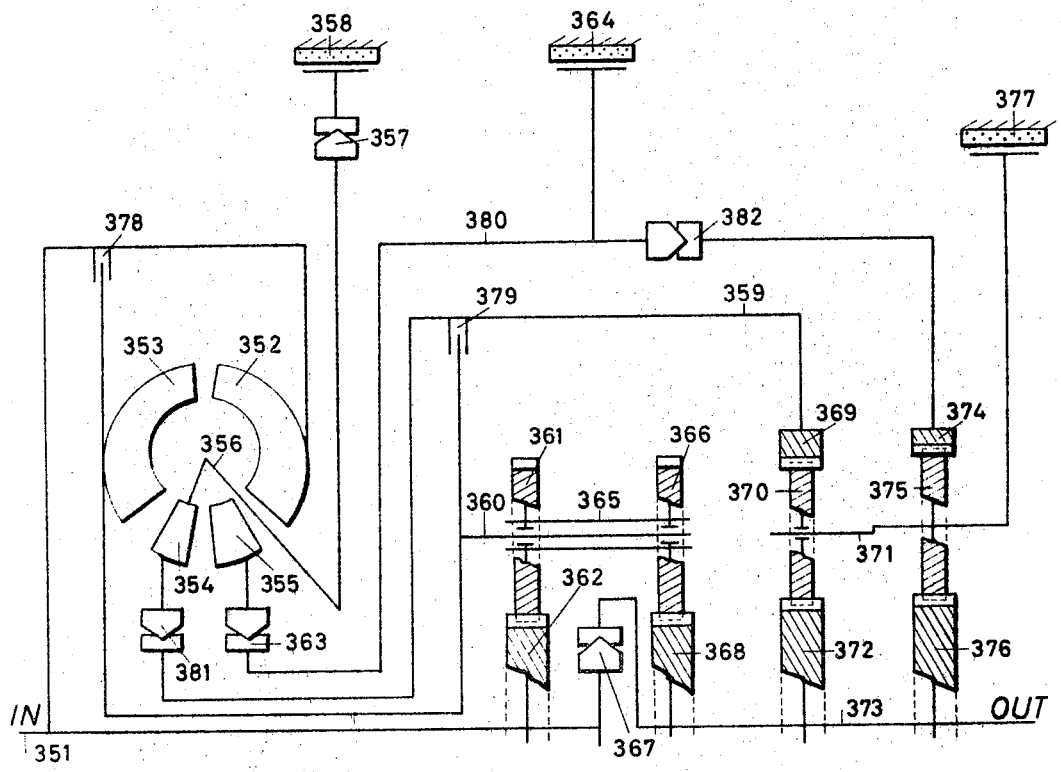

FIG. 9 is a schematic view of a transmission including a modified spur epicyclic gear train (two sun gears and two sets of planet pinions connected to the same carrier), a hydrodynamic torque converter having two reactors, each one respectively connected to the driven shaft by two reversing devices consisting of epicyclic gear trains.

Figure 10:
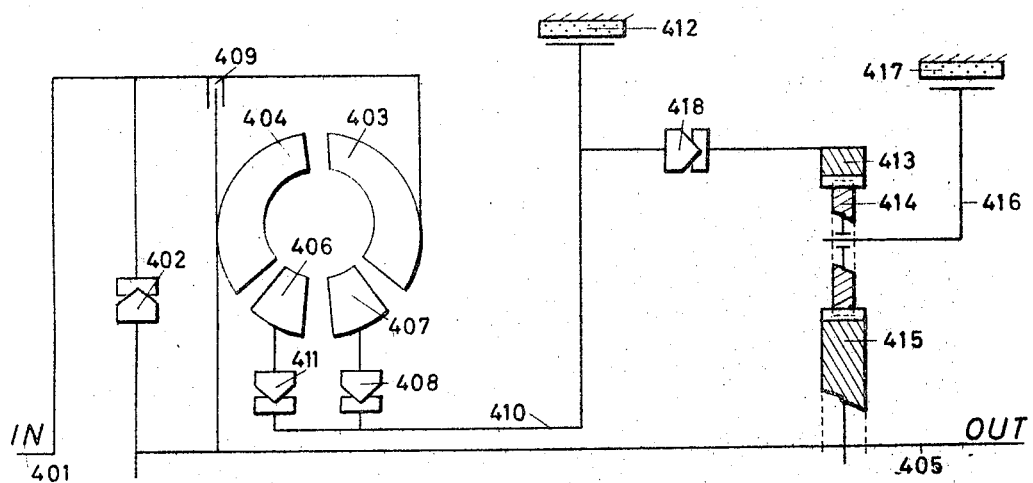

FIG. 10 is a schematic view of a transmission including a hydrodynamic torque converter with a reactor connected to the driven shaft by means of a reversing device consisting of a spur epicyclic gear train.

Figure 11:
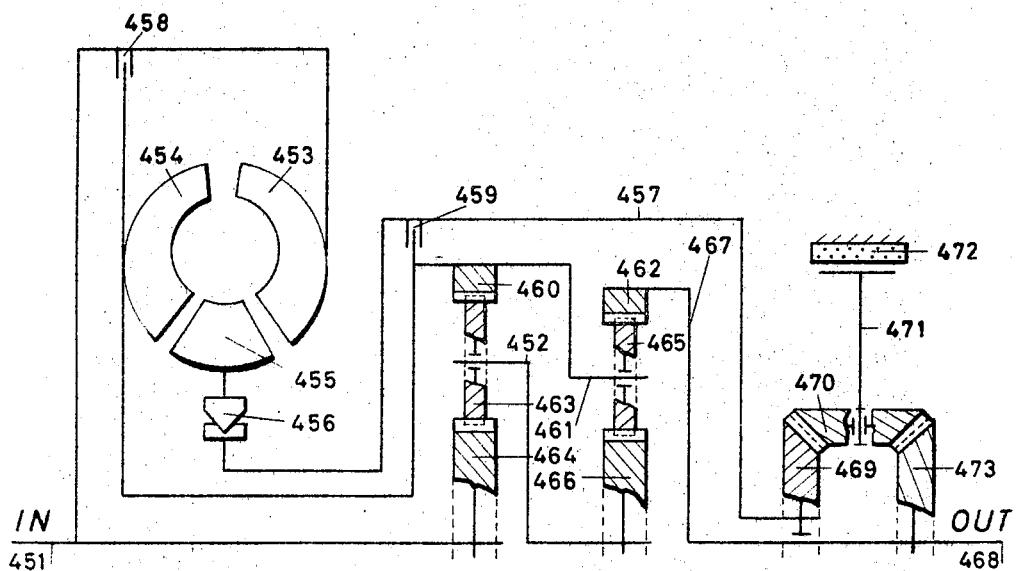

FIG. 11 is a schematic view of a transmission in which the arrangement of the epicyclic gear trains is similar to that shown in FIG. 5, but with a modified arrangement of the hydrodynamic torque converter. The reversing device consists of a bevel epicyclic gear train and only one selective brake is utilized.

Figure 12:
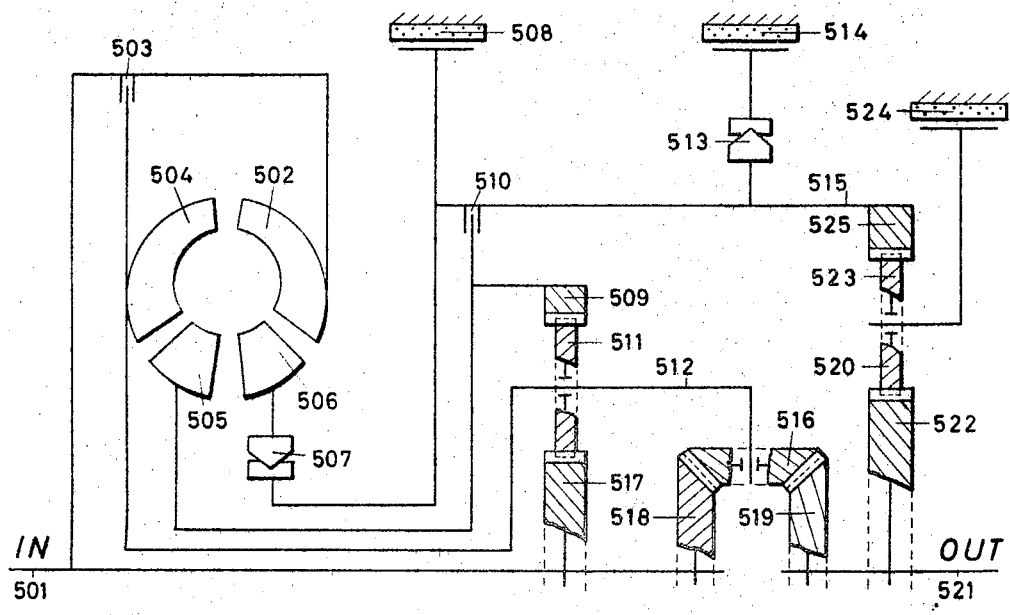

FIG. 12 is a schematic view of a transmission, wherein the second epicyclic gear train is of the bevel gear type and the reversing device consists of a spur epicyclic gear train. The arrangement of the two first epicyclic gear trains is different from that shown in FIG. 11.

Figure 13:
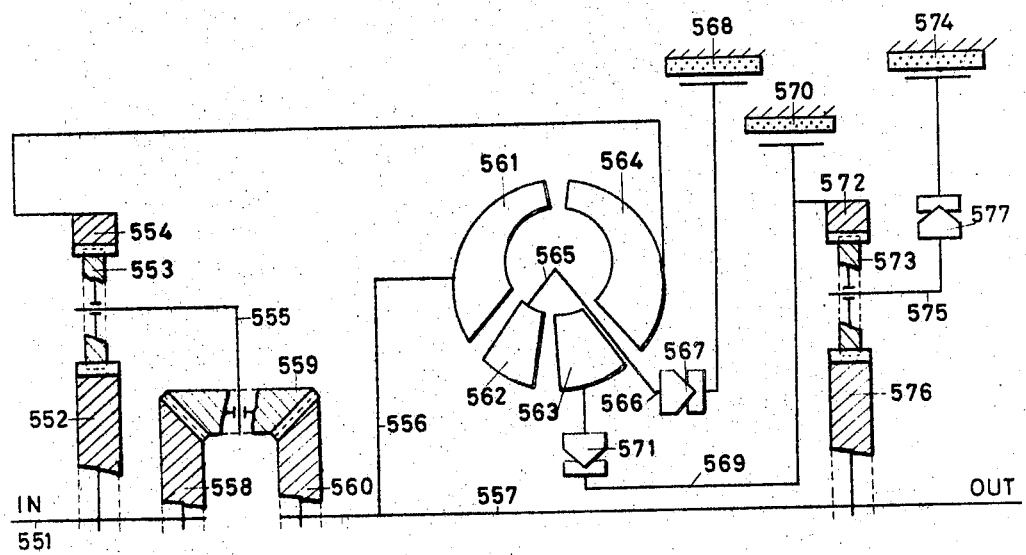

FIG. 13 is a schematic view of a transmission similar to that of FIG. 12, but with the hydrodynamic torque converter here modified and with the reactor connected to the driven shaft being the second reactor of the converter.

Figure 14:
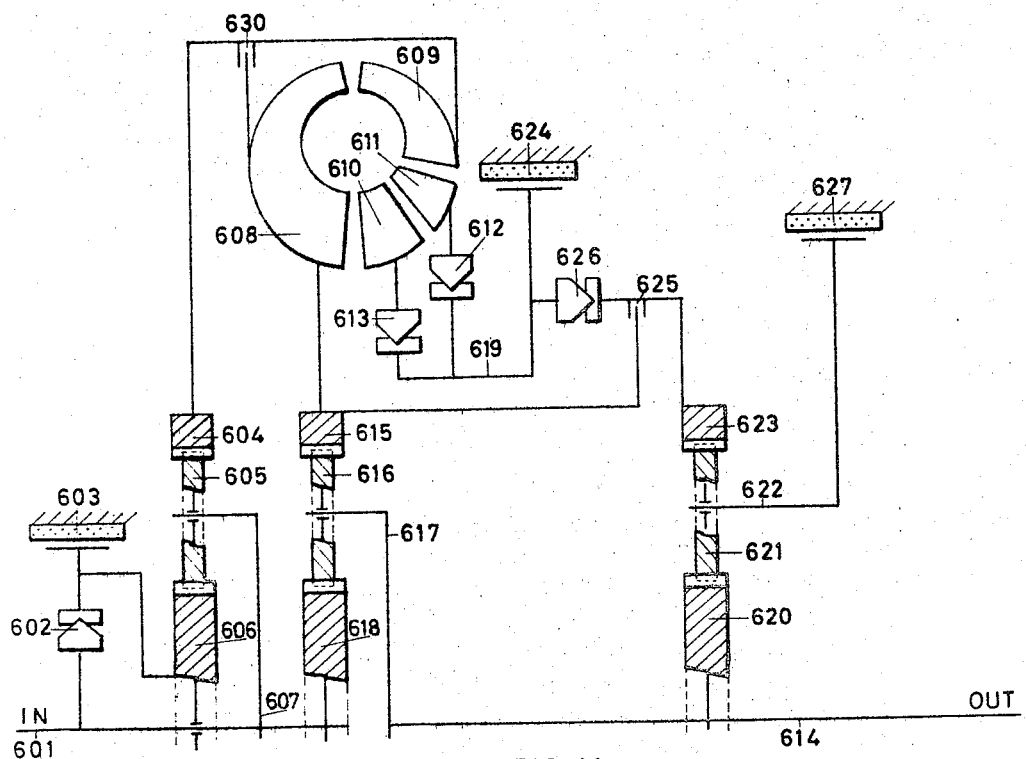

FIG. 14 is a schematic view of a transmission similar to that of FIG. 8 but including two reactors, braking means to hold stationary each of said reactors, and an overspeed gear between the driving shaft and the impeller.

Figure 15:
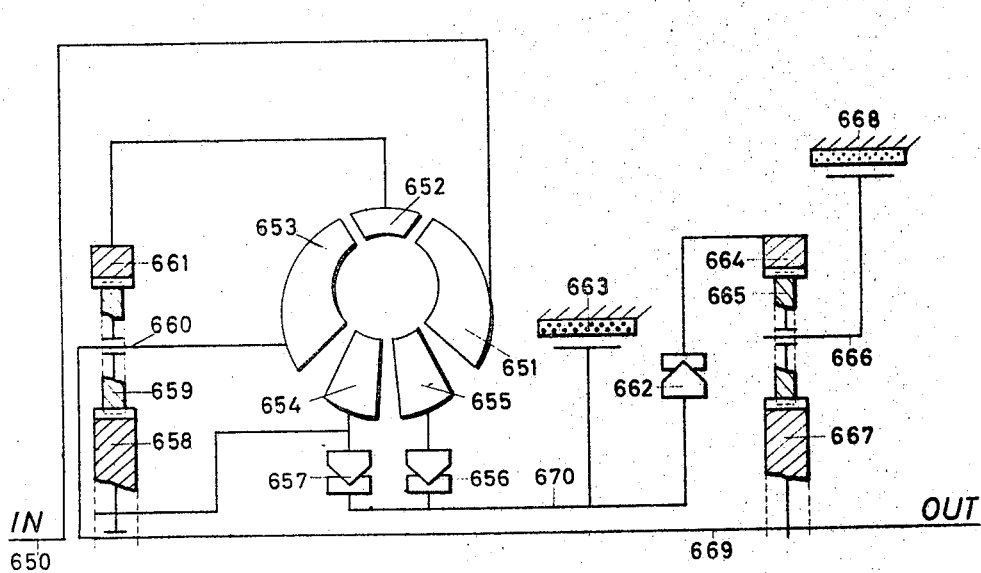

FIG. 15 is a schematic view of a transmission according to the principal objective of present invention including a hydrodynamic torque converter having two turbines and two reactors, a spur epicyclic gear train connected to the members of said converter and a reversing device consisting of a spur epicyclic gear train.

Figure 16:
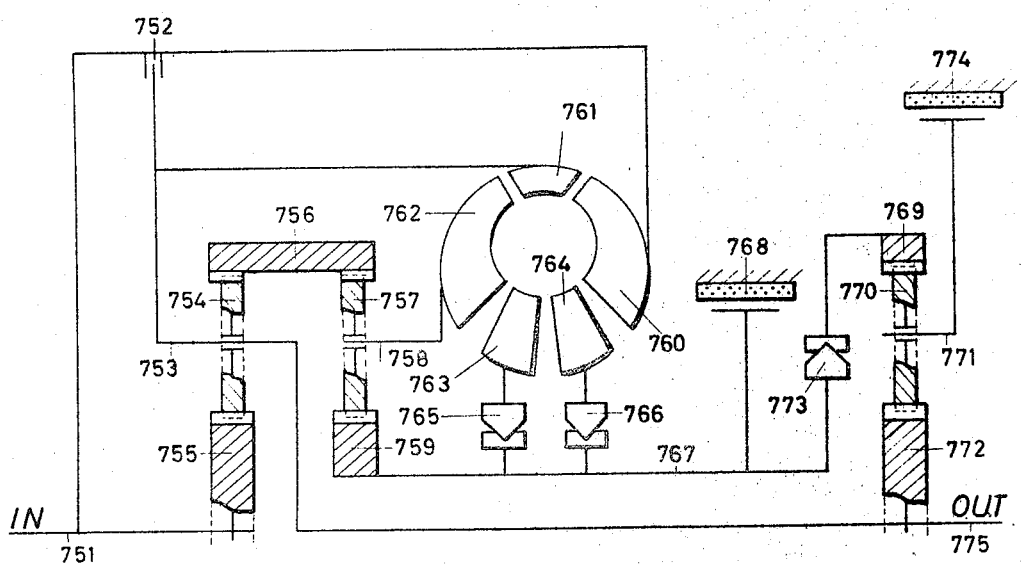

FIG. 16 is a schematic view of a transmission wherein both the gearing and a reactor are connected to the driven shaft by a reversing spur epicyclic gear train.

Figure 17:
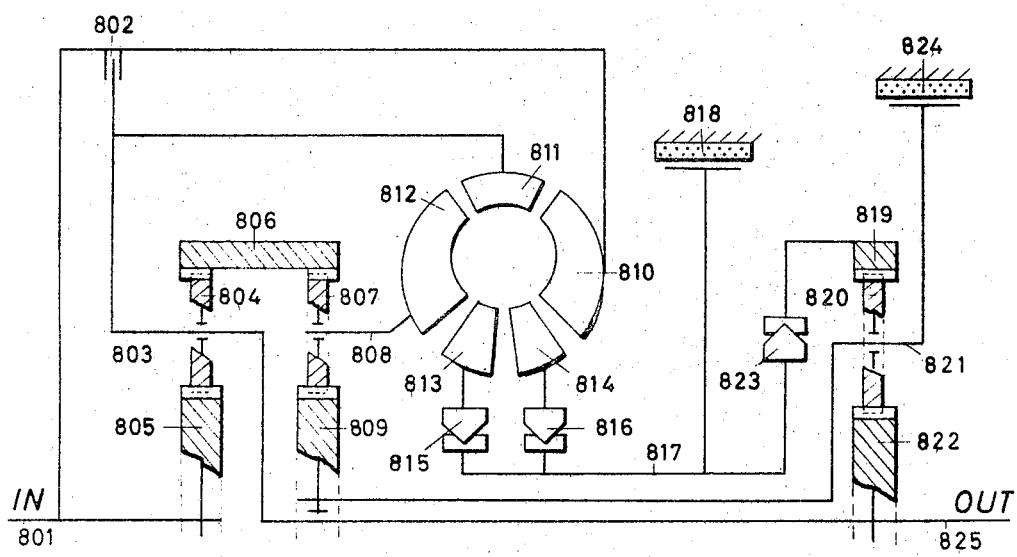

FIG. 17 is a schematic view of a transmission wherein the reactor is connected to the driven shaft by a reversing spur epicyclic gear train.

Figure 18:
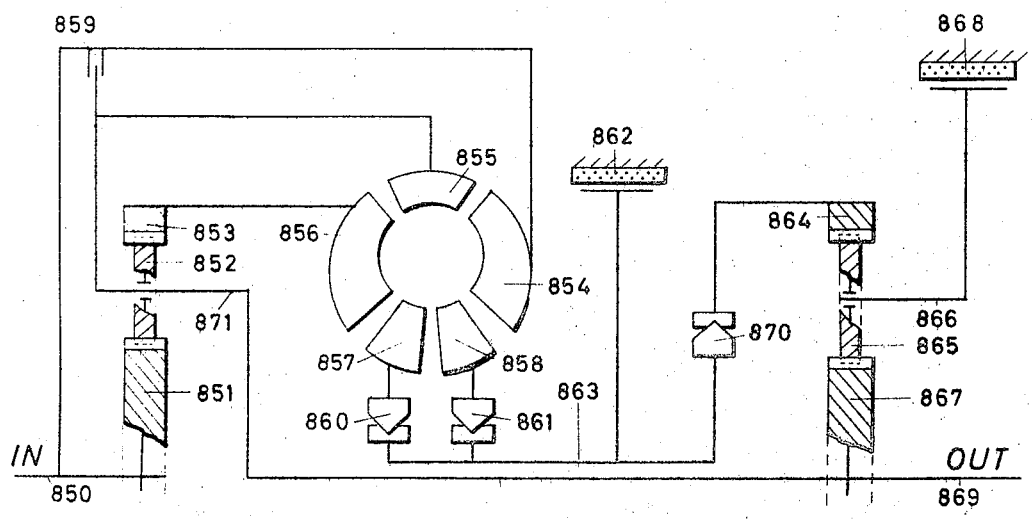

FIG. 18 is a schematic view of a transmission wherein the reactor is connected by a reversing device to the driven shaft, the reversing device consisting of a spur epicyclic gear train.

Figure 19:
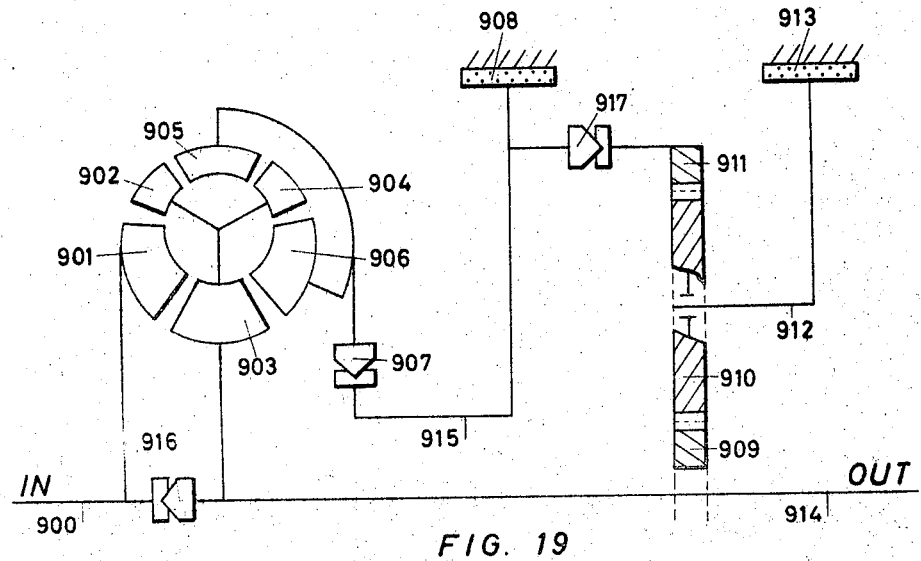

FIG. 19 is a schematic view of a transmission similar to that in FIG. 10, but utilizing a hydrodynamic torque converter that has a turbine formed by three bladed wheels and with two reactor bladed wheels arranged in between the turbine blade wheels.

FIG. 20 is a schematic view of another embodiment of the invention, utilizing my improved control system.

FIG. 21 is a schematic view of a transmission similar to that of FIG. 5, utilizing my improved control system. In this embodiment, unlike that of FIG. 20, the automatic control system includes only mechanical and fluid means.

Figure 22:
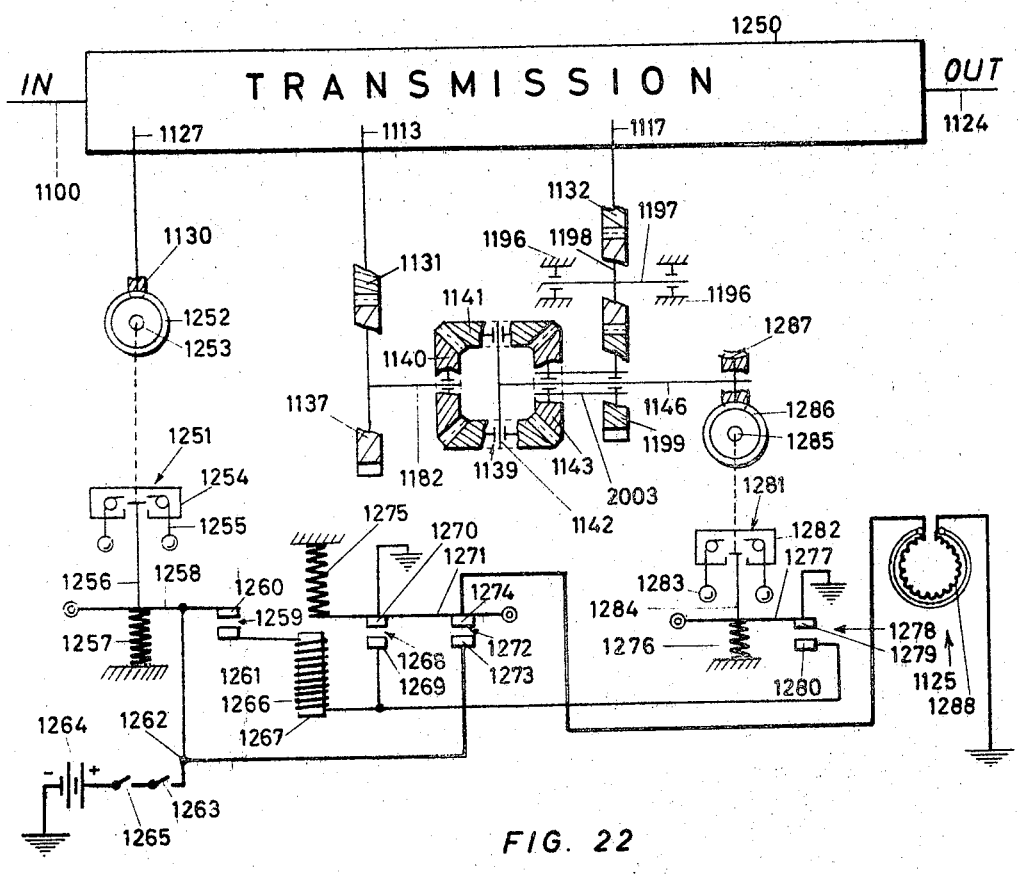

FIG. 22 is a schematic view of another form of my automatic control system which is particularly useful with the embodiments of the transmission illustrated in FIGS. 5–21. As illustrated, this form of control system includes only electromechanical means.

FIG. 23 is a schematic view of still another form of my automatic control system, said embodiment including electrical and pneumatical means.

Figure 24:
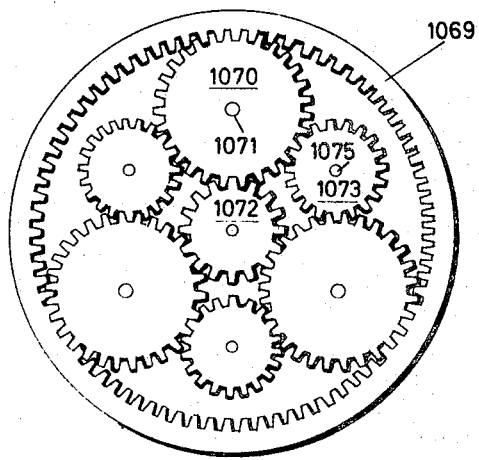

FIG. 24 is a sectional view of one of the epicyclic gear trains of FIG. 20.

Figure 1:
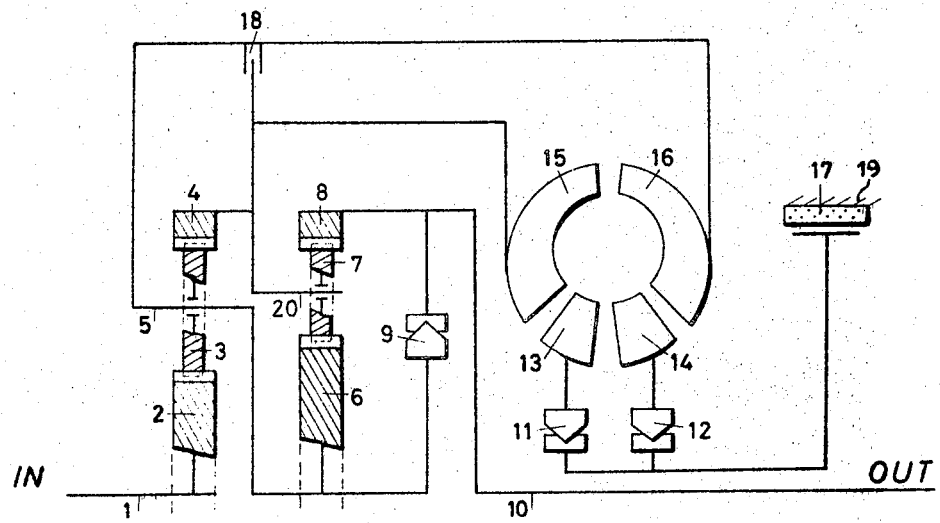
FIG. 1 is a schematic illustration of a transmission, including two spur epicyclic gear trains, two reactors, a selective brake, a one-way clutch and a clutch.

Referring now to the drawings, and in particular to FIG. 1 wherein is shown a schematic view of a transmission comprising a driving shaft 1 fixed to the sun gear 2 of a first train of epicyclic gears. The carrier 5 of the planet pinions 3 of said train is fixed to the impeller 16 of a hydrodynamic torque converter, and it is also fixed to the sun gear 6 of a second spur epicyclic train. The hydrodynamic torque converter consists of an impeller element 16 having blades, a turbine element 15 having blades and two bladed reactors 13 and 14 arranged to provide a toroidal path for the flow of fluid therebetween. The ring gear 4 of the first epicyclic train is fixed to the carrier 20 of the planet pinions 7 of said second epicyclic train, and it is also fixed to the turbine 15 of said torque converter. The impeller 16 can be selectively engaged to the turbine 15 of the torque converter by means of the clutch 18.

The ring gear 8 of the second spur epicyclic train is fixed to the driven shaft 10, and it is connected to the sun gear 6 of said train by means of a one-way clutch 9.

The reactors 13 and 14 of the hydrodynamic torque converter are connected to the stationary housing 19 by means of the one-way brakes 11 and 12 respectively and brake 17.

In operation, with the driving shaft rotating and the driven shaft stationary, if brake 17 is disengaged and the driving shaft is rotating slowly, the torque delivered to the driven shaft is negligible and the transmission is at idle.

When brake 17 is engaged the transmission is in drive, with the one-way brakes 11 and 12 preventing reverse rotation of reactors 13 and 14, respectively. The input torque from the driving shaft 1 is split, with a fraction driving the impeller 16 of the torque converter. Thus, an increased torque is applied to the turbine 15 through the fluid in the torque converter housing, and this torque is then transmitted to the driven shaft through the second epicyclic train of gears.

When the speed of the driven shaft increases and the transmission ratio of the speeds of the driven and driving shafts approaches unity, the ratio of speeds between the turbine and the impeller of the torque converter also approaches unity and the first reactor 13 begins to freewheel. As the ratio of speeds of the driven and driving shafts more closely approaches unity, the second reactor 14 also begins to freewheel and the transmission becomes a coupling. To obtain direct drive from the transmission, with greater efficiency than can be obtained with a coupling, the clutch 18 is engaged to provide direct drive without fluid transmission.

When a vehicle in which the transmission is used is towed or pushed the one-way clutch 9 automatically engages the driven shaft 10 to the carrier 5 of the planet pinions, in such a way that a rigid mechanical coupling is attained, through which rotation of shaft 10 is transmitted to shaft 1.

Figure 2:
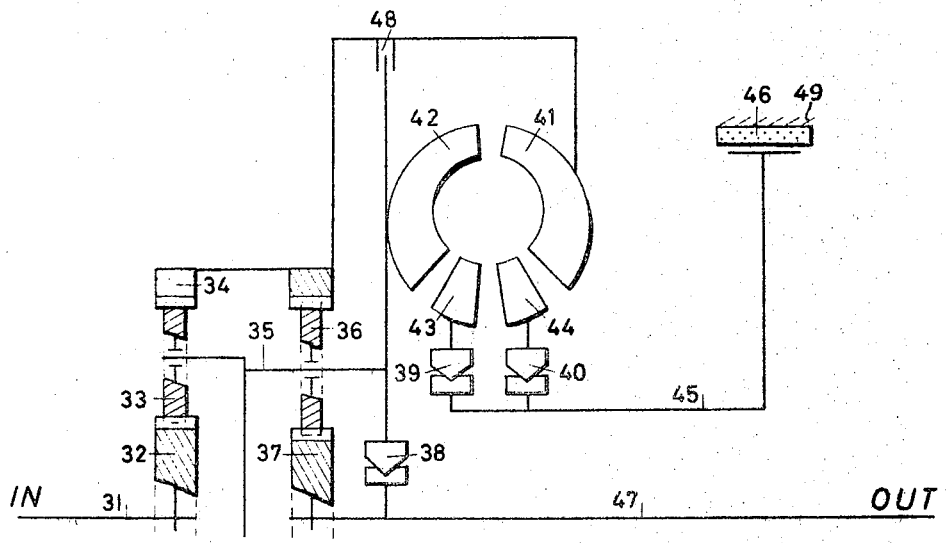
FIG. 2 is a schematic illustration of a transmission including the same components as the transmission of FIGURE 1 but interconnected in a different arrangement.

The transmission mechanism shown in FIG. 2 comprises a driving shaft 31, which is fixed to the sun gear 32 of a first spur epicyclic train. The ring gear 34 of said train is in mesh with the planet pinions 33 of said train, and it is also in mesh with the planet pinions 36 of a second train of spur epicyclic gears. The carrier 35 of the planet pinions and the ring gear 34 are common to both epicyclic gear trains.

The sun gear 37 of the second epicyclic train is fixed to the driven shaft 47. The ring gear 34 is fixed to the impeller 41 of an hydrodynamic torque converter. The turbine 42 of said converter is fixed to the converter 35 of planet pinions of both epicyclic gear trains, and it is also connected to the driven shaft 47 by means of a one-way clutch 38.

The reactors 43 and 44 of the torque converter are connected, respectively, by means of the one-way brakes 39 and 40, to a sleeve 45 that can be held stationary by means of the brake 46 operating with respect to stationary housing 49, as in FIG. 1. The turbine 42 is also connected to the impeller 41 by a clutch 48.

The operation of this embodiment of the transmission is similar to the operation of the embodiment illustrated in FIG. 1.

The transmission mechanism shown in FIG. 3 includes a driving shaft 51 fixed to the bevel sun gear 52 of a first bevel epicyclic gear train. A carrier shaft 54 of the bevelled orbital gears 53 of said train is connected to a spur gear 55 that is in mesh with gear 56 of a fixed ratio speed reducing train. Gear 56 is rigidly connected to gear 58 of said train through shaft 76, which is rotatably mounted on stationary bearings. Gear 59 is in mesh with gear 58 of the speed reducing train, and it is connected to the turbine 64 of a hydrodynamic torque converter. The illustrated converter has an impeller element consisting of two pumps of stages 65 and 66, the turbine element 64, and two reactors 67 and 68 arranged to provide a toroidal path for the flow of fluid therebetween.

The bevelled sun gear 57 of the first train of bevelled epicyclic gears is fixed to shaft 69, which also is fixed to the impeller 65 of the torque converter and to the bevelled sun gear 70 of a second train of bevelled epicyclic gears.

The reactors 67 and 68 of the torque converter are connected, by means of the one-way brakes 61 and 62, respectively, to the sleeve 75 which can be held stationary by means of brake 60.

The turbine 64 is also fixed to the carrier 71 of the orbital bevel gears 72 of the second train of bevel epicyclic gears.

The sun gear 73 of the second train is fixed to the driven shaft 74 of the transmission.

The operation of this embodiment is much like that of the device illustrated in FIG. 1. When brake 60 is disengaged, the transmission is idling.

When brake 60 is engaged the one-way brakes 61 and 62 prevent the reverse rotation of reactors 67 and 68, respectively. At first the second stage 66 of the impeller is rotated by the fluid at a speed greater than that of the first stage 65, thus insuring a more suitable inlet angle for the fluid entering the first stage of the impeller. As a consequence, the efficiency of the hydrodynamic torque converter is improved. A one-way clutch 63 prevents the second stage 66 from rotating at a lower speed than does the first stage 65.

Assuming a speed reduction ratio of 1.5 to one in the gear set 55–56–76–58–59, when the hydrodynamic torque converter is performing as a coupling, the ratio of transmission between the driving and driven shaft has a value of 2.0 to one.

Figure 4:
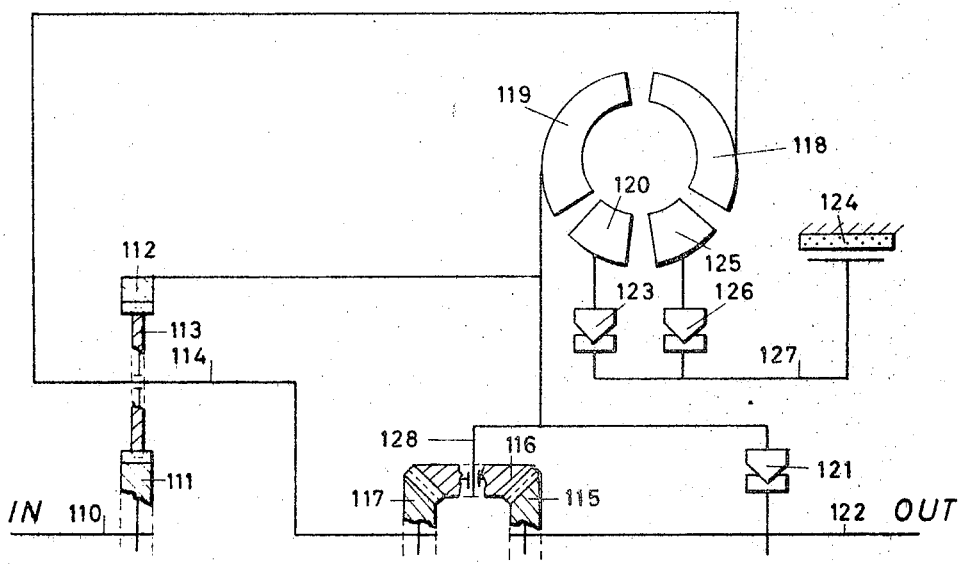
FIG. 4 is a schematic illustration of a transmission train, two reactors, a selective brake and a clutch between cluding a spur epicyclic gear train, a bevel epicyclic gear the driven shaft and the carrier of the bevel orbital gears.

The embodiment illustrated in FIG. 4 comprises a driving shaft 110 fixed to the sun gear 111 of a train of spur epicyclic gears. The carrier 114 of the planet pinions of said gear train is connected to the impeller 118 of a hydrodynamic torque converter, and is also connected to the bevel sun gear 117 of a bevelled epicyclic train. The hydrodynamic torque converter here illustrated is similar to that shown in FIG. 1.

The ring gear 112 of the first epicyclic train is fixed to the turbine 119 of said torque converter, and it is also connected to the carrier 128 of the gears 116 of the bevelled epicyclic train.

The reactors 120 and 125 of the torque converter are connected to the sleeve 127 by the one-way brakes 123 and 126, respectively.

The sleeve 127 can be held stationary by the brake 124. The carrier 128 of the bevelled orbital gears is also connected to the driven shaft 122 by means of the one-way clutch 121, and the second bevelled sun gear 115 of the bevelled epicyclic train is fixed to the driven shaft of the transmission.

The operation of this embodiment of the transmission is similar to those previously described. When brake 124 is disengaged the transmission is idling. When the brake is engaged, the transmission begins to operate. When the hydrodynamic torque converter is performing as a coupling, the total transmission ratio is 1.0 to one. When the vehicle is moved by towing or pushing, the one-way clutch 121 is automatically operated, and the transmission becomes a rigid mechanical coupling.

FIG. 5 shows a transmission including a driving shaft 150, which is fixed to the sun gear 151 of a first spur epicyclic train. The carrier 154 of the planet pinions 152 of said first epicyclic train is fixed to the sun gear 159 of a second spur epicyclic train, and it is also selectively connected to the ring gear 153 of said first epicyclic train by means of the clutch 155.

The ring gear 153 is also fixed to the carrier 158 of the planet pinions 157 of said second spur epicyclic gear train. The ring gear 156 of said second epicyclic train in connected to the sun gear 159 by means of the one-way brake 160, and it is fixed to the driven shaft 174.

The carrier 154 is also fixed to the impeller 161 of a hydrodynamic torque converter similar to the one described in FIG. 1 and the ring gear 153 is also fixed to the turbine 162 of said torque converter.

The reactors 163 and 164 are connected to the sleeve 167 by means of the one-way brakes 168 and 166, respectively.

The sleeve 167 can be held stationary by the brake 175 and it is connected by the one-way clutch 176 to the ring gear 169 of a third epicyclic gear train. The ring gear 169 is connected to the turbine 162 by the lock-up clutch 165.

The sun gear 172 of said third epicyclic train is fixed to the driven shaft 174, and the carrier 171 of the planet pinions 170 of said train can be selectively held stationary by means of brake 173.

The operation of this form of transmission is in some aspects similar to the operation of that illustrated in FIG. 1. However, the reversing gear unit 169–170–171–172 insures greater efficiency of the power transmission during initial movement of the driven shaft 174.

The transmission is at idle when both brakes 175 and 173 are disengaged. In starting the operation of the transmission, brake 173 is engaged to apply a multiplied torque to the driven shaft 174. When the speed of the driven shaft increases, the reverse speed of the sleeve 167 also increases. The reactors 163 and 164 are also rotating in the reverse sense with sleeve 167, but when the reverse rotation of said sleeve exceeds a certain value, first the reactor 163 and then the reactor 164 begin to freewheel. Before both reactors begin to freewheel, brake 175 is engaged.

The torque multiplication initially attained when brake 173 is engaged is greater than the multiplication attained by engaging brake 175.

When the ratio of speeds between the driven and driving shafts approaches unity, with brake 175 engaged, first the reactor 163 and thereafter reactor 164 begins to freewheel. The hydrodynamic torque converter thus becomes a coupling. When it is desired to obtain direct drive from the transmission with greater efficiency than can be obtained through the coupling, the clutch 155 is engaged.

It is to be noted that both stationary brakes 175 and 173 can be simultaneously engaged when the transmission is in operation, as result of the function of the one-way clutch 176.

The selective operation of the above mentioned stationary brakes can be performed by means of the action of a human operator, or it can be fulfilled automatically.

When the vehicle is being towed or pushed, the driven shaft is turning and the driving shaft is connected to be rotated therewith through one-way clutch 160.

When the clutch 165 is engaged, brake 173 is also engaged and brake 175 is disengaged. The driving and driven shafts are then connected through a fixed reverse gearing ratio. For instance, assuming that the three epicyclic trains of gears are identical, and the ratio of diameters of sun gear to ring gear is 0.7, then the driving and driven shafts have a gear ratio of 6.28.

FIG. 6 shows a transmission device comprising a driving shaft 200, which is fixed to the sun gear 201 of a first train of spur epicyclic gears. A carrier 204 of the planet pinions 202 is fixed to the impeller 211 of a hydrodynamic torque converter similar to the one shown in FIG. 1. The ring gear 203 of said epicyclic train is fixed to the turbine 212 of said converter, and it is also fixed to the carrier 208 of the planet pinions 207 of a second spur epicyclic gear train. The carrier 204 is fixed to the ring gear 209, which is also connected to the driven shaft 224 by means of the one-way brake 210. The ring gear 206 of the second epicyclic train is fixed to the driven shaft 224 which is also fixed to the sun gears 219 and 228 of first and second reversing spur epicyclic trains, respectively.

The reactors 213 and 214 of the torque converter are connected to the sleeve 216 by one-way brakes 231 and 232 respectively. The sleeve 216 is fixed to the ring gear 217 of the first reversing epicyclic train. The carrier 220 of the planet pinions 218 of the first epicyclic train is connected, by the clutch 221, to the carrier 227 of the planet pinions 226 of the second reversing epicyclic gear train. The carrier 220 is also fixed to the disk 222, which is connected to the ring gear 225 of the second reversing epicyclic train by means of the clutch 223. The ring gear 225 can be held stationary by means of the brake 230 and the carrier 227 can be held stationary by the brake 229. The turbine 212 is connected to the sleeve 216 by the clutch 215 and the impeller 211 is connected to the turbine 212 through clutch 205.

In considering the operation of this embodiment of the transmission, let "$u$" denote the ratio between the diameter of the sun gear 219 and the inner diameter of the ring gear 217, and similarly, let $v$ denote the ratio of diameters of the gear 228 and gear 225. Furthermore, let $v$ be greater than $u$.

The transmission is at idle when both brakes 229 and 230 are disengaged, clutch 221 is disengaged and clutch 223 is engaged.

To place the transmission in drive, brake 229 is engaged and, as a result, the ratio between the speeds of rotation of sleeve 216 and of driven shaft 224 is equal to $(-u+v+uv)$.

When the ratio of rotation speeds between driving shaft to driven shaft increases, the reactors tend to freewheel. However, before freewheeling begins, brake 229 is disengaged and brake 230 is engaged in order to preserve the efficiency of the transmission. As a result, the ratio between the speeds of the sleeve 216 and the driven shaft 224 is $-u$, and since this is less than the ratio between the speeds of rotation of sleeve 216 and shaft 224, in absolute value, the reactor is still transmitting torque to the driven shaft through the first reversing epicyclic train. Later, assuming a further decrease in the value of the ratio of speeds of driving to driven shafts, but before the reactors can begin to freewheel, clutch 223 is disengaged and clutch 221 is engaged. Now, the ratio of speeds of the sleeve 216 to driven shaft has a positive value equal to $$\frac{v-u}{1-v}$$

Under these circumstances the transmission has a multiplied output torque, since the total torque exerted on the driven shaft is the sum of a torque delivered by the driving shaft and the torque delivered by the stationary housing through the brake 230. When the ratio of speeds of the driving to the driven shaft even more nearly approaches unity, both reactors become freewheeling and the transmission is a coupling, with no output torque multiplication.

The means connecting the reactor to the driven shaft in the transmission mechanism shown in FIG. 6 includes more elements than that in FIG. 5. These extra elements permit the transmission to be operated with suitable efficiency within a wider range of speed ratios.

To obtain direct drive from transmission without the fluid coupling, clutch 205 is engaged. It is to be noted that brakes 229 and 230 are never simultaneously engaged when the transmission is in operation.

When the vehicle is being pushed or towed rotation of driven shaft 224 is transmitted to the driving shaft 200 through a one-way clutch 210.

When the clutch 215 is engaged, reverse transmission can be attained in two fixed transmission ratios. One of such ratios is attained with brake 229 engaged and clutch 223 engaged, brake 230 disengaged and clutch 221 disengaged. The other of the reverse transmission ratios is obtained by disengaging clutch 221 and engaging brake 230.

Reference is made here to FIG. 7 wherein is shown a schematic view of a transmission device comprising a driving shaft 250 which is fixed to the sun gear 251 of a bevel epicyclic train. The carrier 254 of the orbital bevel gears 252 of said train is fixed to a gear 256, and the sun gear 253 of the same train is fixed to the shaft 255. Gear 256 is rotatably mounted on shaft 255 and is in mesh with gear 257 which is fixed to gear 259 by means of the jack shaft 258 which is rotatably mounted in bearings carried by the stationary housing of the transmission. Gear 260 is in mesh with gear 259 and is rotatably mounted on shaft 255. The turbine 262 of a hydrodynamic torque converter is fixed to a sleeve 261 which is fixed to gear 260 and it is also fixed to the carrier 270 of the bevel orbital gears 271 of a second bevel epicyclic train. The hydrodynamic torque converter consists of an impeller element 263, said turbine element 262 and one reactor 264 arranged to provide a toroidal path for the flow of fluid therebetween.

The reactor 264 is connected to a gear 274 by means of a one-way brake 267, and the gear 274 is also fixed to a sleeve 266. Sleeve 266 is adapted to be connected by the brake 268 to the stationary housing and the reactor 264 can be connected to the driven shaft 273 through a reversing gear unit. The reversing gear unit comprises a gear 274 that meshes with a spur gear 275 which is fixed to the jack shaft 276 and which is also in mesh with a gear 277 that is fixed to jack shaft 278. Jack shaft 278 is connected to jack shaft 280 through a clutch 279. A spur gear 281 is fixed to shaft 280, and meshes with another spur gear 282 that is fixed to the driven shaft 273. The jack shafts 278 and 280 are rotatably mounted through stationary bearings 265. The impeller 263 of the hydrodynamic converter is fixed to the shaft 255 which is fixed to the bevel sun gear 269. The second bevel sun gear 272 of the second bevel apicyclic train is fixed to the driven shaft 273.

The operation of this transmission is, in some aspects, similar to the operation of the device shown in FIG. 5. Here, however, the connection between the reactor and the driven shaft is through a clutch 279, whereas in the construction of FIG. 5 the connection is through brake 173.

The transmission is idling when both clutch 279 and brake 268 are disengaged. To start drive operation of the transmission, clutch 279 is engaged, thus causing the reactor to be connected to the driven shaft 273 through the reversing gear unit 274–275–276–277–278–279–280–281–282, giving, as a result, a multiplied torque at the driven shaft 273. At moderate speeds of driven shaft 273, clutch 279 is disengaged and brake 268 is engaged. Assuming a speed reduction ratio of value 1.5 in the gear set 256–257–258–259–260, when the ratio of speeds between the driving and driven shafts approaches 1/2, the reactor 264 begins to freewheel and the hydrodynamic torque converter becomes a coupling. The ratio of 1/2 cannot be exceeded in the present mechanism.

When it is desired to exert a braking action on the driven shaft, brake 268 and clutch 279 are both engaged.

Referring now to FIG. 8, wherein the illustrated embodiment of the transmission comprises a driving shaft 301 fixed to the impeller 302 of a hydrodynamic torque converter similar to the one described in connection with FIG. 3, and also fixed to the sun gear 306 of a spur epicyclic train. The turbine 303 of the converter is fixed to the carrier 305 of the planet pinions 307 in the epicyclic train.

The ring gear 308 of the epicyclic train is fixed to the driving shaft 314 which is fixed to the sun gear 312 of a reversing spur epicyclic train, and which is also connected, by means of a one-way brake 309, to the sun gear 306 of the first epicyclic train.

A first reactor 304 is connected to the ring gear 310 of the reversing epicyclic train through the one-way brake 320 and sleeve 323. The carrier 315 of the planet pinions 311 of the same train can be held stationary by means of the brake 313. The sleeve 323 is connected to the turbine 303 by a lock-up clutch 325. A second reactor 316 is connected to the stationary housing by the one-way brake 319 and a brake 322. The impeller of the converter has two stages; the second stage 317 is connected to the first stage 302 by the one-way clutch 318. The sleeve 323 can be held stationary by the brake 321.

The impeller 302 is selectively connected to turbine 303 by means of the clutch 324.

In operation of this embodiment the transmission is at idle when brakes 313, 321 and 322 are disengaged. To start drive operation of the transmission, brake 313 is engaged. At moderate speeds of the driven shaft brake 313 is disengaged and brakes 321 and 322 are both engaged. At first the second stage 317 of the impeller is forced to rotate by the fluid in the converter at a speed greater than that of the first stage 302. A one-way clutch 318 keeps the second stage 317 from rotating at a speed lower than that of the first stage 302.

As the ratio of speeds between driving and driven shafts approaches unit, first the reactor 304 and later the reactor 316 begin to freewheel. When both reactors are freewheeling the converter acts as a coupling between the driving and driven shafts.

To obtain direct drive from the transmission without fluid coupling it is only necessary to engage clutch 324.

When the driven shaft is operating as a prime mover of the transmission, as when a vehicle is being pushed or pulled, the one-way clutch 309 directly connects the driven shaft to the driving shaft.

When the clutch 325 is engaged, the driving and driven shafts are connected through a fixed reverse gearing ratio.

When it is desired to exert braking action on the driven shaft, brakes 313 and 321 are simultaneously engaged.

In FIG. 9 there is illustrated another embodiment of the invention including a driving shaft 351 that is fixed to the impeller 352 of a hydrodynamic torque converter similar to that one described in FIG. 1, and that is also fixed to the sun gear 362 of a first spur epicyclic train and to a driven shaft 373 by means of a one-way brake 367.

The first reactor 354 of the torque converter is connected by means of a strut 356, the one-way brake 357 and brake 358 to the stationary housing. This reactor is also connected by a one-way brake 381 to the sleeve 359, which is connected to the carrier 360 by means of a lock-up clutch 379. The sleeve 359 is fixed to the ring gear 369 of a spur epicyclic train that includes a carrier 371 for the planet pinions 370 and a sun gear 372 which is fixed to the driven shaft 373. The carrier 371 is common to the planet pinions 370 of said train and to the planet gear 375 of another spur epicyclic train that includes a ring gear 374 and a sun gear 376 which is fixed to the driven shaft 373. The carrier 371 can be held stationary by the action of the brake 377.

The second reactor 355 is connected to a sleeve 380 by a one-way brake 363. The sleeve can be held stationary by the brake 364 and it is also connected by the one-way brake 382 to the ring gear 374.

The impeller 352 is connected to the turbine 353 by a clutch 378. The turbine 353 is fixed to a carrier 360 for planet pinions 361 and for planet pinions 366. Planet pinions 361 are fixed to the planet pinions 366 by the sleeve 365, which is rotably mounted on the carrier 360. The planet pinions 361 mesh with the sun gear 362 and the planet pinions 366 mesh with the sun gear 368 which is fixed to the driven shaft 373.

In the operation of this embodiment the transmission is idling when brakes 358, 364 and 377 are disengaged. To start operation of the transmission, brake 377 is engaged to cause the first reactor 354 to transmit a torque to the driven shaft through the gears 369–370–372, and the second reactor 355 to transmit a torque to the driven shaft through the gears 374–375–376. The reverse rotation speed of the second reactor will then be less than the speed of the first reactor and, as a consequence, a better efficiency is attained in the performance of the torque converter since the speed of the second reactor is nearer to the speed of the impeller than the speed of the first reactor. The fluid from the blades of the first reactor is directed through the blades of the second reactor, with the result being a suitable inlet angle to the impeller blades. As the reactors begin to freewheel brake 358 is first engaged and, thereafter, brake 364 is also engaged. One way brakes 382 and 381 allow rotation of the driven shaft, even if all three brakes 358, 364 and 377 are simultaneously engaged.

When the vehicle is being towed or pushed, rotation of the driven shaft is transmitted to the driving shaft through the one-way clutch 367. Reverse drive can be obtained from the transmission by engaging the clutch 379 and the brake 377.

When it is desired to achieve direct drive without the fluid coupling, clutch 378 is engaged.

Referring now to FIG. 10, wherein a schematic view of an embodiment of the transmission is shown including a driving shaft 401 connected to the driven shaft 405 through a one-way clutch 402. The driven shaft is also fixed to the impeller 403 of a hydrodynamic torque converter similar to that one described in FIG. 1. The turbine 404 is fixed to the driven shaft 405 and it is connected selectively by the clutch 409 to the impeller 403.

The reactors 406 and 407 are respectively connected through one-way brakes 411 and 408 to a sleeve 410. The sleeve 410 is connected to the stationary housing by the brake 412 and it is also connected by a one-way brake 418 to the ring gear 413 of a spur epicyclic train. The carrier 416 of the planet pinions 414 of said train can be held stationary by the brake 417. The sun gear 415 of said train is fixed to the driven shaft 405.

The operation of this embodiment is similar to that shown in FIG. 5. The transmission is idling when both brakes 412 and 417 are disengaged. To start drive operation of the transmission, brake 417 is engaged. The subsequent operation is entirely similar to the embodiment shown in FIG. 5.

Reference is made now to FIG. 11 wherein there is shown a schematic view of an embodiment of the transmission including a driving shaft 451 fixed to the sun gear 464 of a first train of spur epicyclic gears and also fixed to the impeller 453 of a hydrodynamic torque converter similar to that one described in FIG. 7, through a clutch 458. The turbine 454 of the torque converter is fixed to the ring gear 460 of the first spur epicyclic train and the carrier 452 of the planet pinions 463 of said train is fixed to the sun gear 466 of a second spur epicyclic train. The carrier 461 of the planet pinions 465 is fixed to the ring gear 460. The reactor 455 of said torque converter is connected to the sleeve 457 by the one-way brake 456. The sleeve 457 is fixed to the bevel sun gear 469 of a bevel epicyclic train, said sun gear being rotably mounted on the driven shaft 468. The sleeve 457 can be selectively connected to the turbine 454 by the clutch 459. The ring gear 462 of the second spur epicyclic train is fixed to the driven shaft 468 by means of the disk 467 to which is also fixed the bevel sun gear 473. The carrier 471 of the orbital bevel gears 470 of said bevel epicyclic train can be held stationary by the brake 472. The impeller 453 is connected to the turbine 454 by the clutch 458.

In the operation of this embodiment the transmission is idling when brake 472 is disengaged. To start drive operation of the transmission brake 472 is engaged, with a resultant multiplied torque being applied to the driven shaft 468. When the ratio of speeds between the driving and driven shafts decreases to a certain point depending on the particular design, the reactor 455 begins to freewheel. When the reactor and the turbine of the torque converter rotate at the same speed as the impeller the converter acts as a coupling affording direct drive between the driving and driven shafts.

When it is desired to obtain direct drive without the fluid coupling, the clutch 458 is engaged. To obtain reverse drive, clutch 459 is engaged.

It is to be noted that this particular embodiment, while simplified, illustrates the connective arrangement between the reactor and the driven shaft in accordance with the objects of the invention.

In FIG. 12 there is shown a schematic view of another embodiment of the transmission including a driving shaft 501 fixed to the sun gear 517 of a first train of spur epicyclic gears.

The impeller 502 of a hydrodynamic torque converter, similar to the one shown in FIG. 1, is fixed to the carrier 512 of the planet pinions 511 of the first spur epicyclic train. The turbine 504 is fixed to the ring gear 509 and it is connected to the impeller 502 by the clutch 503. The first reactor 505 of said torque converter can be selectively engaged to the ring gear 509 by means of the clutch 510. The second reactor 506 of the torque converter is connected to the stationary housing 508 by the one-way brake 507.

The sun gear 517 of the first spur epicyclic train is fixed to the bevel sun gear 518 of the bevel epicyclic train, and the bevel epicyclic train, and the carrier 512 of the first spur gear train is also carrier of the bevel orbital gears 516 of the bevel epicyclic train.

The bevelled sun gear 519 of the bevel epicyclic train is fixed to the sun gear of a reversing spur epicyclic train and also fixed to the driven shaft 521. The ring gear 525 of said reversing train is connected to the stationary housing by means of the sleeve 515, the one-way brake 513 and brake 514, and is fixed to the first reactor 505. The carrier 523 of the planet pinions 520 of the reversing spur epicyclic train can be held stationary by the selective brake 524.

To start operation of the transmission, brake 524 is engaged and brake 514 is disengaged. For moderate speeds of the driven shaft, brake 524 is disengaged and brake 514 is engaged. Direct drive, without fluid coupling can be obtained by engaging the clutch 503. It is to be noted that this transmission can be in operation when both brakes 514 and 524 are engaged. Reverse drive can be obtained by engaging clutch 510 and, simultaneously, engaging also brake 524.

When it is desired to exert braking action on the driven shaft, brakes 514 and 524 are simultaneously engaged.

This transmission utilizes a new arrangement between the first and second epicyclic gear trains wherein the driven shaft is connected to one element of the first epicyclic gear train, and is also connected to one element of the second epicyclic gear train.

Other unique features are the particular connections of the one-way brake 513 and the connection of the second reactor, to the other members.

In FIG. 13 another embodiment of the transmission is shown, including a driving shaft 551 fixed to the sun gear 552 of a first spur epicyclic train and also fixed to the bevelled sun gear 558 of a bevel epicyclic train. The carrier 555 is common to both the planet pinions 553 and to the beveled orbital gears 559 of the two epicyclic trains. The ring gear 554 is fixed to the impeller 564 of a hydrodynamic torque converter similar to that one described in connection with FIG. 1.

The turbine 561 of the torque converter is fixed to the driven shaft 557 by means of a disk 556. The driven shaft is also fixed to the bevelled sun gear 560 of the bevel epicyclic train. The first reactor 562 of the hydrodynamic torque converter is connected to the stationary housing through the strut 565, the sleeve 566, the one-way brake 567 and the brake 568. The second reactor 563 of said torque converter is connected to the stationary housing through the one-way brake 571, the sleeve 569, and the brake 570. The sleeve 569 is fixed to the ring gear 572 of a reversing spur epicyclic train.

The carrier 575 of the planet pinons 573 of the reversing epicyclic train can be held stationary by means of the one-way brake 577 and the brake 574. The sun gear 576 of said epicyclic train is fixed to the driven shaft 577 of the transmission.

The transmission is at idle when brakes 568, 570 and 574 are disengaged. To start drive operation brake 574 is arranged differently, as shown by oneway brake 577. brake 568 is engaged and, later, brake 570 is also engaged. When the hydrodynamic torque converter becomes a coupling, the transmission is also a coupling.

In this transmission, the grouping arranged between the first and second epicyclic gear trains is similiar to that of the transmission shown in FIG. 12, but the connections of said gear trains with the members of the hydrodynamic torque converter are different. In this embodiment the second reactor is connected, by a reversing unit to the driven shaft. In addition, the one-way brake employed is arranged differently, as is shown by one-way brake 577.

In FIG. 14 I show a schematic view of another embodiment of the transmission wherein a driving shaft 601 is fixed to the carrier 607 of the planet pinions 605 of a first spur epicyclic gear train, and is also fixed to the sun gear 618 of a second spur epicyclic train.

The sun gear 606 of said first epicyclic train is rotatably mounted on and connected to the driving shaft 601 by means of the one-way clutch 602 and it can be held stationary by means of the brake 603. The ring gear 604 of said first epicyclic train is fixed to the impeller 609 of a hydrodynamic torque converter similar to that one described in connection with FIG. 1. The turbine 608 of said torque converter is fixed to the ring gear 615 of a second spur epicyclic train, and it can be selectively engaged to the impeller 609 by means of a clutch 630.

The reactors 610 and 611 are respectively connected to the sleeve 619 by one-way brakes 613 and 612. The sleeve 619 can be held stationary by the brake 624 and it is connected to the ring gear 623 by means of the one-way brake 626. The ring gear 623 is connected to the ring gear 615 by means of the lock-up clutch 625.

The carrier 617 of the planet pinions 616 of the second spur epicyclic gear train is fixed to the sun gear 620 of the reversing spur epicyclic train. Both carrier 617 and sun gear 620 are also fixed to the driven shaft 614. The carrier 622 of the planet pinions 621 of the reversing train is connected to the stationary housing by means of the brake 627.

In the operation of this embodiment the transmission is at idle when brakes 624 and 627 are disengaged. To start operation, brakes 627 and 603 are engaged to place the unit in a first drive condition corresponding to the usual manually operated transmission device. Second drive condition is attained by disengaging brake 603. A third drive condition is attained by disengaging brake 627 and engaging brakes 603 and 624 and a fourth drive condition is attained by disengaging brake 603. Direct drive is attained when both reactors 610 and 611 are free wheeling and direct transmission without the fluid coupling is achieved when clutch 630 is engaged and brake 603 is disengaged.

In achieving reverse drive, clutch 625 is engaged and brake 627 is engaged.

In this embodiment, with properly designed transmission members, the great number of transmission stages enables the torque converter to operate almost continually within its narrow range of greatest efficiency.

In FIG. 15 there is shown a schematic view of a transmission comprising a driving shaft 650 fixed to the impeller 651 of a hydrodynamic torque converter. The hydrodynamic torque converter consists of said impeller element 651, a first turbine element 652 and a second turbine element 653, and two reactors 654 and 655 arranged to provide a toroidal path for the flow therebetween. The first turbine 62 is fixed to the ring gear 661 of a spur epicyclic train and the second turbine 653 is fixed to the carrier 660 of the planet pinions 659 of the epicyclic train.

The sun gear 658 of said epicyclic train is rotatably mounted on the driven shaft 669 to which are fixed the carrier 660 of that same train and the sun gear 667 of a reversing spur epicyclic train.

The sun gear 658 is fixed to the first reactor 654 of the hydrodynamic torque converter. The reactors 654 and 655 are connected to the sleeve 670 by one-way brakes 657 and 656, respectively. The sleeve 670 can be held stationary by the selective brake 663, and is connected by the one-way brake 662 to the ring gear 664 of a spur reversing epicyclic train. The carrier 666 of the planet pinions 665 of said reversing epicyclic gear train can be held stationary by means of the brake 668.

In operating this embodiment of the transmission brake 668 is first engaged and brake 663 is disengaged. As the speed of the driven shaft increases, brake 663 is engaged. When the direct drive is reached, the reactors 654 and 655 are freewheeling and the torque converter is a coupling.

In FIG. 16 there is shown a schematic view of a transmission including a driving shaft 751 fixed to the sun gear 755 of a first spur epicyclic train, and also fixed to the impeller 760 of a hydrodynamic torque converter similar to that one described in connection with FIG. 15. The first turbine 761 of the torque converter is fixed to the carrier 753 of the planet pinions 754 of the epicyclic gear train, and it can be selectively engaged to the impeller 760 by the clutch 752. The carrier 753 is also fixed to the sun gear 772 of a reversing spur epicyclic train.

The second turbine 762 of said torque converter is fixed to the carrier 758 of the planet pinions 757 of a second spur epicyclic gear train. The ring gear 756 is common to both first and second spur epicyclic trains. The sun gear 759 of the second epicyclic train is fixed to a sleeve 767.

The reactors 763 and 764 of the torque converter are connected to the sleeve 767 by one-way brakes 765 and 766, respectively. The sleeve 767 can be held stationary by means of a brake 768.

The ring gear 769 of the reversing spur epicyclic train is connected to the sleeve 767 by a one-way brake 773, and the carrier 771 of the planet pinions 770 of said train is connected to the stationary housing by means of the selective brake 774. The sun gear 772 is also fixed to the driven shaft 775 of the transmission.

In operating this embodiment of the transmission brake 768 is first engaged. After the driven shaft is rotating, brake 768 is engaged. Direct drive without fluid coupling is attained by engaging clutch 752. In this embodiment a gearing is provided such that the velocity ratio between the latter turbine and the planetary gear element makes the turbine speeds more nearly equal than they would be without the gearing. This gearing and the shaft on which the reactors are mounted are connected to the driven shaft by means of a reversing epicyclic gear train. As a result the power efficiency of the transmission is greater at low speeds of the driven shaft.

Reference is made now to FIG. 17. The embodiment of the transmission shown in this figure is similar to that shown in FIG. 16. The difference between the two embodiments is that, as is shown in the present figure, the sun gear 809 of the second epicyclic train is connected to the carrier 821 of the planet pinions 820 of the reversing epicyclic train, whereas in FIG. 16 the corresponding gear is connected to the sleeve on which are mounted the freewheels of the reactors.

In the present embodiment the sun gear 809 is stationary during the entire operation of the transmission under load. Otherwise, the operation of this embodiment is exactly the same as that already described in connection with FIG. 16. The performance characteristics of the two embodiments are much alike.

In FIG. 18 there is shown a schematic view of an embodiment of the transmission including a driving shaft 850 fixed to the sun gear 851 of a first train of epicyclic gears, and also fixed to the impeller 854 of a hydrodynamic torque converter similar to that one described in connection with FIG. 15.

The first turbine 855 of said torque converter is fixed to the carrier 871 of the planet pinions 852 of said first train of gears, and can be selectively connected to the driving shaft by means of the lock-up clutch 859. The second turbine 856 of said torque converter is fixed to the ring gear 853 of said first train of gears.

The reactors 857 and 858 are connected by means of the one-way brakes 860 and 861, respectively, to the sleeve 863. Said sleeve can be held stationary by the selective brake 862, and it can also be connected to the ring gear 864 of a reversing epicyclic train by means of the one-way brake 870.

The carrier 871 of the planet pinions 852 of the first train of epicyclic gears is also fixed to the sun gear 867 of said reversing epicyclic train, and the carrier 866 of the planet pinions 865 of said reversing train can be held stationary by means of the brake 868. The sun gear 867 of the reversing epicyclic train is also fixed to the driven shaft 869.

The operation of this embodiment is similar to those shown in FIGS. 16 and 17. In this embodiment a reversing gear unit is interposed between the reactor and the driven shaft. As a result the power efficiency of the transmission is greater at low speeds of the driven shaft.

In FIG. 19 there is shown a schematic view of an embodiment of the transmission including a driving shaft 900 fixed to the impeller 901 of a hydrodynamic torque converter. The hydrodynamic torque converter consists of an impeller element 901, a turbine element having three bladed wheels 902, 903 and 904 fixed among themselves, and a reactor having two bladed wheels 905 and 906 fixed between themselves, and arranged to provide a toroidal path for the flow of fluid therebetween.

The turbine is fixed to the sun gear 909 of a reversing spur epicyclic train, and the reactor is connected to a sleeve 915 by the one-way brake 907.

The sleeve 915 can be held stationary by the brake 908, and it is connected to the ring gear 911 by the one-way brake 917.

The carrier 912 of the planet pinions 910 of the reversing epicyclic gear train can be held stationary by means of the brake 913. The sun gear 909 of said train is also fixed to the driven shaft 914.

The driving shaft 900 is connected to the driven shaft 914 by means of the one-way clutch 916.

The operation of this embodiment is similar to that shown in FIG. 10.

In FIG. 20 there is shown a schematic view of another embodiment of the transmission including a driving shaft 950 fixed to the impeller 1056 of a hydrodynamic torque converter similar to that one described in connection with FIG. 1. The turbine 1057 of said converter is fixed to the shaft 1076. The reactors 1059 and 1058 of the converter are connected to the stationary sleeve 1063 by the one-way brakes 1061 and 1060.

The sun gear 1072 of a spur epicyclic train is rotatably mounted on shaft 1076 with the epicyclic gear train also including a carrier 1071 of planet pinions 1070 and a ring gear 1069 which can be held stationary by the brake 1055. Sun gear 1072 is connected to the shaft 1076 by the clutch 1068 and it can be held stationary by the brake 1054. The second sun gear 1074 is fixed to the shaft 1076 and is in mesh with the planet pinions 1073 which are also in mesh with the planet pinions 1070. The carrier 1075 of the planet pinions 1073 is fixed to the disk 1077 which is fixed to the driven shaft 1078. The carrier 1071 is also fixed to said disk 1077. A sectional view of the first of said epicyclic gear trains is illustrated in FIG. 24, which shows the meshing relations between its elements. It is to be noted that the second epicyclic gear train does not include a ring gear. Low speed drive is obtained by engaging brake 1054 when clutch 1068 and brake 1055 are disengaged. Direct drive is obtained by engaging clutch 1068 when brakes 1054 and 1055 are disengaged and reverse drive is obtained by engaging brake 1055, when clutch 1068 and brake 1054 are both disengaged.

The preferred hydraulic electrical control for the transmission comprises a driving shaft pump 955 and a driven shaft pump 980. The driving shaft pump comprises two pump gears 956 and 957 in mesh with each other and disposed in a pump casing 954. The gear 956 is connected by means of a shaft 952 with a gear 951 which is in mesh with a gear 953 fixed on the driving shaft 950, so that the pump 955 is driven by this shaft.

The driven shaft pump 980 comprises gears 972 and 973 which are in mesh and are disposed in a pump casing 971. The gear 972 is connected by means of a shaft 974 with a gear 970 which is in mesh with a gear 969 fixed on the driven shaft 1078, so that the pump 980 is driven by this shaft.

Both of the pumps 955 and 980 are connected with a fluid sump 1080 which may simply constitute the oil pan for the transmission. The pump 955 is disposed in a fluid conduit 1079 and the pump 980 is disposed in a fluid conduit 976 both of which have their entrance ends in the sump 1080, and the pumps are driven so as to draw fluid out of the sump 1080 and into the conduits 1079 and 976.

Conduits 1079 and 976 include a common leg. Each of the conduits 1079 and 976 include a check valve 959 and 958, respectively.

Conduit 976 also includes a pressure relief valve 981 in communication with sump 1080 by means of conduit 978.

Valve mechanism indicated generally at 987 is utilized for controlling engagement of the brake 1054 and clutch 1068. The fluid pressure responsive motors 1033 and 1046 have fluid pressure supplied thereto for engaging the clutch 1068 and disengaging the brake 1054 when the ports 962 and 964 are in communication.

The valve mechanism 987 comprises a valve casing 993 provided with a cylindrical cavity 992 in which is slidably disposed a valve piston made up of the lands 988 and 989 fixed to each other by the stem 990. The valve casing 993 is provided with ports 963 and 964 which are in communication with conduit 991, and is also provided with ports 961 and 962. Port 961 is in communication with the low pressure end of conduit 1079, and port 962 is in communication with the high pressure end of conduit 1079 through conduit 1053, a three-way stopcock 966 and conduit 1000. Port 964 is in communication with the fluid pressure responsive motor 1033 of the clutch 1068 through the conduits 965 and 968, and it is also in communication with the fluid pressure responsive motor 1046 of the brake 1054 through conduits 965 and 967.

The valve piston is moved by means of a solenoid 996. The solenoid comprises an armature 997, which is connected to the land 988 by the stem 995 so that the piston and armature move together, and a spring 994 for yieldably biasing the lands 988 and 989 as far to the right in housing 987 as they can travel. In the drawing the solenoid is illustrated as holding the piston such that lands are at their limit positions, held against the biasing effect of spring 994. When the solenoid is deenergized the armature 997 is moved to the position 1002 shown by dotted lines. The electric solenoid also includes coils 999 and 998. Both of these coils are connected with the contact 1006 of a switch 1004 as shown, and both are grounded. The switch 1004 is operated by the pivoted armature 1007 of an electrical relay including a core 1009 with the winding 1019 thereon. The spring 1008 tends to keep switch 1004 opened, but when winding 1019 is energized, the switch 1004 is closed. The contact 1005 of said switch is connected to the winding 1019 and also is connected to the contact 1012 of a switch 1010. The contact 1011 of switch 1010 is grounded and is carried by a pivoted arm 1018. Switch 1010 is normally held opened by spring 1016 but a governor 1013 is provided for closing the switch 1010 at a predetermined speed of the reactor 1058. The reactor 1058 is connected to governor 1013 through sleeve 1065 fixed to said reactor and also fixed to the gear 1066 in mesh with gear 1029 which drives the governor 1013. Governor 1013 includes two weighted arms 1014 swingably mounted on a rotatable carriage 1017. A longitudinally movable shaft 1015 is acted on by the arms so as to close switch 1010 at a predetermined speed of the governor.

The winding 1019 is connected to one of the contacts of a switch 1020. The other contact of said switch is connected to the battery 1023 of the vehicle through the ignition switch 1083 of the vehicle and is carried by the pivoted arm 1028. Switch 1020 is biased open by action of the spring 1024 and a governor 1025 is provided to close switch 1020 while reactor 1059 is rotating, the switch 1020 being open when reactor 1059 is stationary. Reactor 1059 is connected to the governor 1025 through sleeve 1064 fixed to said reactor and is also fixed to a gear 1067 that is in mesh with the gear 1031 which drives the governor 1025.

As illustrated, governor 1025 includes two weighted arms 1026 swingably connected to a rotatable carriage 1027. A longitudinally movable shaft 1082 is acted on by arms 1026 to close switch 1020 when the governor is rotating at sufficient speed.

The fluid pressure responsive motor 1046 comprises a cylindrical housing 1052 with a piston 1049 slidably disposed therein. Port 1051 is in communication with the conduit 967 and port 1048 is in communication with the high pressure end of the conduit 1079 through conduit 960, a three-way stopcock 966 and conduit 1000.

Conduit 960 can be placed in communication with sump 1080 through the three-way stopcock 966 and conduit 1003. The spring 1050 tends to hold brake 1054 disengaged by biasing piston 1049 to its extreme left position, as viewed in FIG. 20.

The fluid pressure responsive motor 1033 comprises a piston 1035 slidably disposed in the cylindrical housing 1034, with a port 1036 in communication with the conduit 968. Piston 1035 acts on clutch 1068 through a lever 1039, which has its sliding end 1038 in contact with the sliding ring 1040 of the driving plate 1041 of the clutch 1068. Said plate 1041 rotates together with shaft 1076, but it can slide longitudinally along said shaft.

The driven plate 1042 of said clutch is fixed to the sun gear 1072 and also fixed to the disk 1043 which can be held stationary by the brake 1054.

The transmission is at idle when the three-way stopcock 966 is turned to place conduits 960 and 1053 in communication with conduit 1003, while preventing communication from conduits 960 and 1053 to conduit 1000.

To achieve reverse drive, brake 1055 is manually engaged by an operator, the three-way stopcock 966 being left in its idle position, above described.

To obtain forward drive of the transmission, brake 1055 must be manually disengaged and the three-way stopcock 966 must be manually turned to the position shown in FIG. 20. Conduits 1053 and 960 are then in communication with conduit 1000 and flow to conduit 1003 is cut off. Initially, reactors 1058 and 1059 are stationary and switches 1010 and 1020 are therefore open.

The electric circuit through winding 1019 and coil 966 is broken, switch 1004 is opened and armature 997 is spring biased to its extreme right hand position shown at 1002. In this position land 988 prevents communication between ports 962 and 964 but flow is through ports 961 and 963. As a result, there is no fluid pressure acting on, respectively, the left and right sides of pistons 1035 and 1049 and clutch 1068 is disengaged. Fluid pressure generated by operation of driving and driven pumps 955 and 980 acts on the left face of piston 1049, from conduit 1079 through conduit 1000, three-way stopcock 966, conduit 960 and port 1048. This moves the piston to the right, against the bias of spring 1050, to engage the brake 1054. At this time clutch 1068 is disengaged and brake 1054 is engaged and the transmission is in low speed drive.

When the ratio of the speeds of the shaft 1076 and of the driving shaft 950 approaches unity the reactor 1059 begins to freewheel. As a result, switch 1020 is closed by action of governor 1025. However, winding 1019 is not yet energized since switches 1004 and 1010 remain open. As the speed ratio of shafts 1076 and 950 more nearly approach unity, the reactor 1058 also begins to freewheel and, at a predetermined speed, switch 1010, is closed by action of the governor 1013. Thus, winding 1019 is energized and core 1009 exerts attraction on armature 1007 to close switch 1004, thereby energizing coils 999 and 998 of the solenoid 996.

Energization of the solenoid 996 moves armature 997 to the left as is shown in full lines in FIG. 20. The members 995, 988, 990 and 989 of the valve piston are then moved with the armature to the left limit position to thereby place ports 962 and 964 in communication and to simultaneously block communication between ports 963 and 961.

The high pressure end of conduit 1079 is communicated with conduit 965 and the fluid pressure acts on the left side of piston 1035 so as to engage clutch 1068. Furthermore, fluid pressure is exerted on the right side of piston 1049 which is opposed to the fluid pressure exerted on its left side, both pressures being closely equal. The spring 1050 acts to move piston 1049 towards its limit left position and thus disengaging brake 1054.

At this time clutch 1068 is engaged and brake 1054 is disengaged and the transmission is in a high speed drive condition. As a result, the speed of shaft 1076 decreases. With the properly designed hydraulic converter reactor 1059 will still be rotating when reactor 1058 is stationary. Switch 1010 is opened and switch 1020 remains closed. The winding 1019 remains energized since switch 1004 is closed. The high speed drive condition continues, irrespective of the state of switch 1010.

A shift from the high to the low speed drive conditions when either the speed of the driven shaft decreases or when the load on the driven shaft increases sufficiently to immobilize reactor 1059 or to rotate it slower than a predetermined speed. In either case, switch 1020 is opened by spring 1024 and the electric circuit through winding 1019 and coils 998 and 999 is broken. The spring 994 moves the piston of valve 987 to its right limit position wherein ports 962 and 914 are closed by land 988 and, concurrently, ports 963 and 961 are placed in communication. The fluid pressure in conduit 965 decreases, and as a result pistons 1035 and 1049 move to their left and right limit position, respectively; clutch 1068 is disengaged and brake 1054 is engaged.

It is now clear from the description that the different speed drive conditions in the transmission are set automatically according to the speed and load acting on the driven shaft, since the conditions under which the reactors begin to freewheel are dependent on those two factors.

With properly designed reactors and governors, the changing from low to high speed drive conditions is performed, for the same load on the driven shaft, at a greater speed of said shaft than when changing from high to low speed drive, as is commonly desired for automatic transmission devices.

In FIG. 21 I show an embodiment of the transmission similar to that shown in FIG. 5. A driving shaft 1100 is fixed to a sun gear 1001 and the carrier 1104 of the planet pinions 1102 is fixed to the sun gear 1109 and is connected to the ring gear 1103 by means of the clutch 1105. The ring gear 1103 is also fixed to the carrier 1108 of the planet pinions 1107. Another ring gear 1106 is connected to the sun gear 1109 and the driving shaft 1124 by means of the one-way brake 1110. The carrier 1104 is also fixed to the impeller 1111 of a hydrodynamic torque converter, and the ring gear 1103 is also fixed to the turbine 1112 of said torque converter which is similar to the one described in connection with FIG. 5. The reactors 1113 and 1114 are connected to a sleeve 1117 by means of the one-way brakes 1118 and 1116, respectively. The sleeve 1117 can held stationary by the brake 1125 and it is connected by the one-way clutch 1126 to a ring gear 1119.

The ring gear 1119 is releasably connected to the turbine 1112 by the lock-up clutch 1115. The sun gear 1122 is fixed to the driving shaft 1124, and the carrier 1121 of the planet pinions 1120 can be selectively held stationary by means of brake 1123.

The illustrated embodiment of my automatic controlling system includes a driving shaft pump 1184 and a driven shaft pump 1189 similar to those shown in FIG. 20. As in FIG. 20 the driving shaft pump 1184 is driven by gears 1185 and 1186, and driven shaft pump 1189 is driven by gears 1188 and 1187. Both of the pumps 1184 and 1189 are connected with a fluid sump 1178 through interconnected conduits 1176 and 1175, respectively. Each of the conduits 1176 and 1175 includes a check valve 1183 and 1181, respectively, similar to the ones shown in FIG. 20. A pressure relief valve 1179, is positioned in a conduit 1177, that interconnects conduit 1176 and a sump 1178.

A valve mechanism, indicated generally at 1156, is used for controlling the engagement of brake 1125. The fluid pressure responsive motor 1167 has fluid pressure applied thereto for engaging the brake 1125 when the ports 1160 and 1159 of valve 1156 are in communication. The valve mechanism 1156 also includes a valve casing 1165 provided with a cylindrical cavity 1190 in which is slidably disposed a land 1154, connected through a stem 1152 to a land 1191 which is provided with two grooves 1153 in which the retaining ball 1164 may seat by action of spring 1163 located in a cavity 1162 of the casing 1165. The port 1160 extends through casing 1165 to communicate with the high pressure end of conduit 1175, via a conduit 1174, a three-way stopcock 2000 and a conduit 2001. Three-way stopcock 2000 may be turned to a second position so as to place conduit 1174 in communication with sump 1178, through conduit 2002.

Port 1161 communicates with the sump 1178 through conduit 1173. Ports 1158 and 1159 are interconnected by passage 1157 and are connected to conduit 1166, which leads to the fluid pressure responsive motor 1167, through port 1168. The land 1154 of the valve mechanism 1156 is connected to the hollow member 1150 by the stem 1155. The hollow member 1150 is continued in sleeve 1148 which ends in flange 1151 which may be moved by action of governor 1192. In the figure, flange 1151 is shown at its right limit position, and its left limit position is indicated by dotted lines. When hollow member 1150 is at its left limit position, it may be pushed to the right by action of governor 1123 through shaft 1138 which ends at head 1149. The governor 1193 may comprise hinged levers 1135 pivotally mounted on rotatable shafts 1194 and 1138, and connected with balls 1136 which tend to compress spring 1195 when set into rotation. The governor 1193 is driven by controlling bladed wheel 1127 of the hydrodynamic torque converter through strut 1129 fixed to gear 1130 in mesh with a gear 1133 fixed to the shaft 1194. Shaft 1194 is fixed to the governor and is rotably mounted on stationary bearings 1134. The bladed wheel 1127 is rotably mounted on the sleeve 1117.

Governor 1192 includes hinged levers 1144, pivotally mounted on rotatable sleeve 1146 and connected with balls 1145 which tend to stretch spring 1147 when set into rotation. The spring 1147 is connected to ring 1169 which is rotably mounted on shaft 1138. The sleeve 1146 is fixed to the carrier 1142 of the bevel orbital gears 1141 of a controlling bevel epicyclic gear train 1139. The controlling train also includes the bevel sun gear 1140, rotably mounted on shaft 1138, and fixed to the gear 1137 by the sleeve 1182 in mesh with gear 1131 fixed to the reactor 1113 by means of the strut 1128. The sun gear 1143 of said controlling train is fixed to a gear 1199 by means of the sleeve 2003, and is rotably mounted on the sleeve 1146.

Sleeve 1117 is connected to the gear 1199 by a reversing spur gear train including a gear 1198 fixed to the shaft 1197 which is rotably mounted in stationary bearings 1196. Gear 1198 is in mesh with gear 1199 and with a gear 1132, fixed to the sleeve 1117.

Brake 1125, operated by the fluid pressure responsive motor 1167, is engaged when piston 1172 is moved to its right limit position against the bias of spring 1171 by the action of high fluid pressure supplied through port 1168 from conduit 1166. Piston 1172 is slidably disposed in casing 1170 of the fluid pressure responsive motor 1167.

The design of gears 1131, 1137, 1132, 1198 and 1199 is such that the ratio of the speeds of gear 1198 and bevel sun gear 1140 is equal, but of opposite sign, to the ratio of the speeds of sleeve 1117 and bevel sun gear 1143.

In this embodiment the controlling bladed wheels consist of reactor 1113 and one additional bladed wheel 1127, which differs from the embodiment, shown in FIG. 20 wherein the two reactors perform both a controlling function and a power transmitting function.

The transmission is at idle when the three-way stopcock 2000 communicates conduit 1174 with conduit 2002 and brake 1123 is disengaged. When reverse drive is desired brake 1123 and clutch 1115 are engaged. To start forward drive brake 1123 is engaged, clutch 1115 is disengaged, and the three-way stopcock is manually positioned as shown in FIG. 21 to connect conduit 1174 with conduit 2001.

The governors 1192 and 1193 are presently stationary. The head 1149 of shaft 1138 is now at its right limit position and, hence, pushing the piston of the 1156 to its right limit position as indicated by dotted lines, and as result, land 1154 blocks flow between ports 1160 and 1159 and brake 1125 is disengaged.

Under these circumstances the transmission is in its low speed drive condition.

When the bladed wheel 1127 begins to rotate, governor 1193 also begins to rotate, the spring 1195 is compressed and head 1149 moves to the left until it occupies the illustrated full line position. The position of the piston valve 1156 remains unaffected since head 1149 moves within the hollow portion of member 1150. The sleeve 1117 rotates in a reverse sense, together with ring gear 1119, and drives sun gear 1143 forward. The reactor 1113 is also reversely rotating and is driving sun gear 1140, and while the reactor is turning with sleeve 1117, the reverse speed of sun gear 1140 is equal in magnitude to the forward speed of the sun gear 1143. As a result, the carrier 1142 is at standstill.

When the reactor 1113 begins to freewheel the rotation speeds of the sun gears 1140 and 1143 vary, so that the carrier 1142 begins to rotate. Balls 1145 stretch the spring 1147 and, through the levers of governor 1192 and flange 1151, move the piston of valve 1156 towards its left limit position where it is held by the retaining ball 1164 which seats in the right groove of member 1153.

Ports 1158 and 1161 are blocked and ports 1159 and 1160 are connected. Fluid pressure is therefore applied to the left side of piston 1172 to compress the spring 1171 and to engage the brake 1125. The transmission is then in its high speed drive condition. The bladed wheel 1127 is designed to continue rotating after the transmission has been shifted to the high speed drive condition.

If the load on the driven shaft increases, or if the driver of the vehicle moves the accelerator to a more restricted throttle position, the bladed wheel 1127 decreases its speed of rotation and governor 1193 rotates at a slower speed. When the governor speed falls below a predetermined value, spring 1195 overcomes the centrifugal force of balls 1136 and pushes, through shaft 1139 and head 1149, the piston of valve 1156 to its right limit position where it is held by the retaining ball 1164 seating on left groove of member 1153. In this manner the transmission automatically shifts from high to low speed drive condition.

Reactor 1113 is designed such that when the transmission is changed from low to high speed drive condition it is held stationary by the one-way brake 1118. As the transmission ratio approaches unity, first reactor 1113 and then reactor 1114 begin to freewheel. Since the governor 1192 acts to push flange 1151 only to the left, high speed drive condition continues even though the reactor 1113 has been immobilized.

The controlling system here described can be applied to the embodiment of the transmission shown in FIGS. 5 to 19. It can also be applied to embodiments of the transmission of the kind shown in FIG. 20, but in this case it is not necessary to include an epicyclic train of the type shown at 1139 nor reversing trains of the types shown made up of gears 1199, 1198 and 1132 since the reactor controlling the passage from low to high speed drive conditions is mounted on sleeves which are stationary when the transmission is in the low speed drive condition.

Similarly, with but minor modification to include means for comparing the speeds of reactor 1113 and sleeve 1117 the control system shown in connection with FIG. 20 can be used with the transmission embodiment shown in FIG. 21. The means for comparing the speeds may consist, for example, of a bevel epicyclic gear train such as is shown at 1139 and spur gears such as are shown at 1199, 1198 and 1132, in FIG. 21.

In FIG. 22 there is illustrated an electro-mechanical embodiment of the automatic control system for the disclosed power transmission. As illustrated, the control system embodiment is arranged to control an embodiment of the transmission like that shown in FIG. 21. In FIG. 22, however, the transmission in indicated by a block 1250, with its driving shaft and its driven shaft being shown at 1100 and 1124, respectively. The apparatus for obtaining comparison of speeds of the reactor 1113 and the sleeve 1117 in the embodiment of FIG. 22 is similar to the system used in the embodiment illustrated in FIG. 22 and the same numbers are therefore used to denote the same control elements in both figures. The elements of the transmission 1250 which provide reference inputs to the control system are: the gear 1130, which is driven by the controlling bladed wheel 1127 of the hydrodynamic torque converter (which is not explicitly shown in this figure); the gear 1131, which is driven by reactor 1113 of the hydrodynamic torque converter; and the gear 1132, driven by sleeve 1117 (members 1113 and 1117 are not explicitly shown in this figure). The automatic control system acts on brake 1125, which is essentially the same brake 1125 shown in FIG. 21. The brake of FIG. 21 is of the hydraulic type whereas the brake shown in FIG. 22 is electrically operated.

The input members to governors 1251 and 1281 are gears 1130 and shaft 1146, respectively. The rotation of shaft 1146 depends on the relative rotations of sleeve 1117 and reactor 1113.

The gear 1131 is in mesh with a gear 1137 that is fixed to a jack shaft 1182 that is fixed to the sun gear 1140 of an epicyclic bevel gear train 1139.

The gear 1132 meshes with a gear 1198 that is fixed to a shaft 1197 rotably mounted in the stationary bearings 1196. The gear 1198 meshes with a gear 1199 that is fixed to to the bevel sun gear 1143 by means of a sleeve 2003. The carrier 1142 of the orbital bevel gears 1141 is fixed to the shaft 1146 which drives the governor 1281 through a gear 1287 that meshes with a gear 1286 on a shaft 1285 that is fixed to the governor. Gear 1130 meshes with a gear 1252 to drive a shaft 1253 that is fixed to the governor 1251.

The electrical system is very similar to the electrical system shown in FIG. 20. However, in the present embodiment the electrical system acts on a coil 1288 of the electrically operated brake whereas in the embodiment of FIG. 20 the electrical system operates on an armature of a control valve to actuate the hydraulic braking system.

Governor 1251 may comprise two weighted levers 1255 swingably mounted on a rotatable carriage 1254. The longitudinally movable shaft 1256 is acted on by levers 1255 to pivot lever 1258 and thereby close switch 1259 at a predetermined speed of the governor. The spring 1257 biases the switch 1259 to its open position.

The contact 1260 of switch 1259 is connected to the battery 1264 through a switch 1263 and through an ignition switch 1265.

The contact 1261 of switch 1259 is connected to the winding 1266 which is connected to the contact 1280 of the switch 1278. The other contact 1279, of said switch is grounded. When the winding 1265 is energized, it magnetizes coil 1267, which attracts the armature 1271 so as to close switches 1268 and 1272. The spring 1275 normally biases switches 1272 and 1278 to an open position. The contact 1269 of switch 1268 is connected to the winding 1267, and the contact 1270 of the switch is grounded.

The contact 1273 of switch 1272 is connected to the battery through connection 1262 and switches 1263 and 1265. The contact 1274 of switch 1272 is connected to the coil 1288 of the electrically controlled brake 1125.

The governor 1281 may comprise two weighted levers 1283 swingable mounted on a rotatable carriage 1282. A longitudinally movable shaft 1284 is acted on by levers 1283 so as to close switch 1278 at a predetermined speed of the governor by means of the lever 1287.

Spring 1276 biases switch 1278 to its open position.

In the operation of this embodiment the suitable reverse drive condition and the idle condition of the transmission is obtained when switch 1263 is opened.

To achieve forward drive it is necessary that switch 1263 be closed. A change from low to high speed drive conditions is attained when the ratio of speeds between the reactor 1113 and the sleeve 1117 reaches a predetermined value sufficient to close switch 1278 by means of the governor 1281. At this time switch 1259 has been already closed by the governor 1251. The winding 1267 is now energized, and switches 1268 and 1272 are closed. As a result, coil 1288 is energized and brake 1125 is engaged. Since the electrical circuit through the winding is now closed through the switch 1268, high speed drive is held engaged even when switch 1278 is opened. To change from high to low speed, switch 1259 must be opened in response to a predetermined reduction in speed of the bladed wheel 1127, and hence the speed of the governor 1251. When this happens the electrical circuit through the winding 1266 is broken and spring 1275 forces switch 1272 to an open position. The electrical circuit through coil 1288 is then open and brake 1125 is disengaged.

In FIG. 23 I show a particular embodiment of the automatic control system for the power transmission utilizing both mechanical and pneumatical means. The transmission is not shown in detail but is block indicated at 1350. Its driving shaft is shown at 1351 and its driven shaft is at 1352.

The elements of the transmission which provide reference inputs to the control system are: the gear 1405, which drives the governor 1403 that regulates change from high to low speed drive conditions and the gear 1398, which drives the governor 1390 to control the shift from low to high speed drive. The governors operate to place conduit 1407 selectively in communication with a high air pressure system so that the air pressure in the conduit can operate on pressure responsive devices of the transmission 1350 to engage or disengage means for completing a high speed power train.

The control system includes a gear 1411 fixed to the driving shaft 1351 and in mesh with gear 1353 which is fixed to the lay shaft 1354. Gear 1353 drives the piston 1355 of an air compressing unit 1356 through connecting rod 1412. The compressing unit 1356, which includes an air intake valve 1358 and an output valve 1360, communicates with a conduit 1361 that terminates in an air pressure chamber 1366. Conduit 1361 has a pressure relief valve 1364 therein. Chamber 1366 is in communication with the port 1368 of a valve mechanism shown generally at 1375. The valve mechanism includes a valve casing 1374, provided with a cylindrical bore 1385 in which is slidably disposed a piston 1376. The piston is made up of a stem 1381 that is fixed to a land 1379, another land 1377 and another stem 1380 interconnecting the lands 1377 and 1379. Land 1377 is provided with spaced grooves 1378. A detent ball 1387 may rest in either of the grooves 1378 and is biased by a spring 1383 that is located into a cavity 1382 of the casing 1374. The bore 1385 communicates with ports 1372, 1368, 1369 and 1370 in the casing 1374. Port 1372 communicates through conduit 1373 with the atmospheric air. Port 1369 is in communication with conduit 1407 and is also in communication with port 1370 by means of conduit 1371.

The stem 1381 is fixed to a hollow member 1399 which has a sleeve 1387 on one end thereof and which terminates in a flange 1388. The flange 1388 may be pushed by governor 1390 to the left through a sleeve 1389 pivotally connected with the lever 1391. The balls 1392 are pivot connections for levers 1391 and 1393 and the levers 1393 are also pivotally mounted on a sleeve 1396. A spring 1394 is fixed to the balls 1392 and to a ring 1395, rotatably mounted on shaft 1408, and biases the balls 1392 towards each other. The sleeve 1396 is fixed to a gear 1397 which meshes with the gear 1398. A gear 1405 meshes with gear 1404 which is fixed to a jack shaft 1410, rotatably mounted on the stationary bearings 1409. The shaft 1410 drives the governor 1406 which includes levers 1402 and 1401 that are pivotally mounted, respectively, on shafts 1410 and 1408 and which are pivotally connected to balls 1400. A spring 1403 biases the shaft 1408 towards a shaft 1410 that cannot move longitudinally. However, shaft 1408 can force the hollow member 1399 to the right by means of the head 1386.

The operation of this embodiment of the transmission is similar to those previously described in connection with FIGS. 20, 21 and 22.

As illustrated the transmission is shown in its low speed forward drive condition, after starting, so that gear 1405 is rotating and gear 1398 is at standstill. The rotation of gear 1405 causes the balls 1400 to be drawn away from each other and spring 1403 to be compressed.

Since gear 1398 is at a standstill, balls 1392 are biased toward one another, springs 1395 are compressed and sleeve 1389 is at its left limit position.

The change from low to high speed drive conditions is attained when the speed of the governor 1390 reaches a suitable value. At this time, the centrifugal force of balls 1392 moves the piston 1376, overcoming the holding effect of detent ball 1384. The piston is moved to its left limit position wherein the ball 1384 seats in the other groove 1378 of piston 1376. The right end of the hollow member 1399 (as viewed in FIG. 23) is now contiguous to head 1386. The port 1368 is in communication with port 1369, and port 1370 is closed by the land 1379, so that conduit 1407 is communicated with the chamber 1366.

The transmission is now set at high speed drive and the gear 1398 stops turning. Governor 1390 returns to the position shown in FIG. 23 but this motion does not affect the position of flange 1388 which together with piston 1376 are at their left limit positions.

If the speed of the vehicle increases, the head 1386 can move only toward the left. If the speed of the vehicle decreases, the head 1386 can move towards the right end of the hollow member 1399 until further decrease of the speed of the governor 1406 will cause the head 1486 to push against the right end of the hollow member 1399 and to move the piston 1376 to the right until the left limit position illustrated in the figure is reached. In this position ports 1368 and 1369 are closed by land 1379 and conduit 1407 is open to atmosphere through ports 1370 and 1372 and conduit 1373. This shifts the transmission from its high to its low speed drive condition.

It is to be understood that the term element of the epicyclic gear train, as used herein, refers to the ring gear, the planet pinions carrier or the sun gear of the spur epicyclic gear train, or each of the bevel sun gears and the orbital bevel gears carrier of a bevel epicyclic gear train.

I claim:

1. A variable-speed power transmission comprising a stationary housing; driving shaft; a driven shaft; two epicyclic gear trains operatively connecting said driving shaft with said driven shaft to thereby transmit power from said driving shaft to said driven shaft at a variable transmission ratio, said driving shaft being operatively connected with one element of one of said gear trains, said driven shaft being operatively connected with one element of the other of said gear trains, the other elements of said gear trains being grouped in two pairs with each of said pairs including an element of each of said trains; a hydraulic torque converter including an impeller, a turbine and at least one reactor; a one-way brake adapted, when engaged, to connect each reactor to the housing; means for selectively engaging or disengaging each reactor relative to said one-way brake; said impeller and said turbine being adapted to be connected to elements of said pairs.

2. A variable-speed power transmission according to claim 1, further including
    means including at least one reversing device for selectively connecting and disconnecting one reactor and the driven shaft.

3. A variable-speed power transmission, comprising a stationary housing; a driving shaft; a driven shaft; and forward drive means having a gear drive including at least one epicyclic gear train and means connecting said shafts to the elements of the gear drive; a hydrodynamic torque converter having an impeller, at least one turbine, and at least one reactor as elements thereof; and means including at least one reversing device for selectively connecting and disconnecting one reactor and the driven shaft.

4. A variable-speed power transmission according to claim 3 further including braking means adapted to selectively connect the one reactor to the stationary housing.

5. A variable-speed power transmission according to claim 3, wherein the gear drive includes two epicyclic gear trains operatively connecting the driving shaft and the driven shaft, four elements of the trains being grouped as two pairs, with each of said pairs formed by an element of each train.

6. A variable-speed power transmission according to claim 3, wherein the impeller is connected to the driving shaft by means including
    an overspeed gearing;
    braking means to selectively engage and disengage said overspeed gearing; and
    a one-way clutch which drives the impeller at the same speed as the driving shaft when the said braking means is disengaged.

7. A variable-speed power transmission according to claim 3, wherein the gear trains are spur epicyclic gear trains, each including a sun gear, a ring gear, planet pinions, and a carrier of the planet pinions.

8. A variable-speed power transmission according to claim 3, wherein the gear trains are bevelled epicyclic gear trains, each including two orbital bevelled gears and a carrier therefor.

9. A variable-speed power transmission according to claim 3, wherein at least one gear train includes two gears concentrically arranged with respect to the shafts; and
a common carrier of two sets of planet pinions, one of said concentric gears being in mesh with one set of planet pinions and the other said concentric gear being in mesh with the other said set of planet pinions, each of the planet pinions of one of the sets being connected to corresponding planet pinions of the other set.

10. A variable-speed power transmission according to claim 3, further including
a clutch, interconnecting the turbine and the reversing device, and operable to provide reverse drive from the transmission.

11. A variable-speed power transmission according to claim 3, further including a clutch, interconnecting the turbine and the impeller.

12. A variable-speed power transmission according to claim 3, further including
a change speed device; and
means for selectively connecting and disconnecting the reactor and the driven shaft through the said change speed device.

13. A variable-speed power transmission according to claim 3, wherein the torque converter includes at least two reactors; and means adapted to connect the second reactor to the housing.

14. A variable-speed power transmission according to claim 3, further including a one-way clutch adapted to connect two elements of the epicyclic gear trains, said clutch being engaged when the driven shaft operates as a prime-mover of the transmission.

15. A variable-speed power transmission according to claim 3, wherein the impeller of the torque converter is of two stage type, including two bladed wheels; and the impeller stages are connected by a one-way clutch.

16. A variable-speed power transmission according to claim 3, wherein the means connecting said reactor to the driven shaft includes one or more one-way clutches.

17. A variable-speed power transmission according to claim 3, wherein the torque converter includes first and second bladed wheels; and further including
clutch means adapted to connect the driven shaft to the reversing device; and
control means including means connected to the first bladed wheel for operating the clutch means to connect the reactor to the housing when the first blade attains a predetermined relative speed of rotation with respect to the member positioned to connect the driven shaft and the reversing device, thus completing a first forward drive power train, and means connected to said second controlling bladed wheel to cause disengagement of the braking means adapted to selectively connect the reactor to the housing, thus completing a second forward drive power train when said second bladed wheel attains a predetermined speed.

18. A variable-speed power transmission according to claim 5, wherein one gear train is a spur epicyclic gear train and the other is a bevelled epicyclic gear train.

19. A variable-speed power transmission according to claim 13, further including
at least one additional reversing device adapted to connect the second reactor to the driven shaft; and
means for operating said reversing device.

20. A variable-speed power transmission comprising a stationary housing; a driving shaft; a driven shaft; and forward drive means including a hydrodynamic torque converter having an impeller, at least one turbine, and at least one reactor as elements thereof; and means including at least one reversing device for selectively connecting and disconnecting one reactor and the driven shaft, the said reversing device including an epicyclic gear train having an orbiting gear carrier, and means for immobilizing said carrier.

21. A variable-speed power transmission according to claim 20, further including
a change speed device; and
means for selectively connecting and disconnecting the reactor and the driven shaft through the said change speed device.

22. A variable-speed power transmission according to claim 20, wherein the torque converter includes first and second bladed wheels; and further including
clutch means adapted to connect the driven shaft to the reversing device; and
control means including means connected to the first bladed wheel for operating the clutch means to connect the reactor to the housing when the first blade attains a predetermined relative speed of rotation with respect to the member positioned to connect the driven shaft and the reversing device, thus completing a first forward drive power train, and means connected to said second controlling bladed wheel to cause disengagement of the braking means adapted to selectively connect the reactor to the housing, thus completing a second forward drive power train when said second bladed wheel attains a predetermined speed.

23. A variable-speed power transmission including a driving shaft; a driven shaft; a hydrodynamic power transmitting device having at least an impeller, a turbine and one controlling bladed wheel; and means providing a first forward drive power train between said shafts and including clutch and braking means for completing the first power train when engaged; means providing a second forward drive power train between said shafts and including means for completing the second power train when engaged; and means connected to said controlling bladed wheel for causing shifting from said first to said second forward drive by engagement of said means for completing the second power train after said controlling bladed wheel has attained a predetermined speed with respect to another element of the transmission.

24. A variable-speed power transmission according to claim 23, wherein said hydrodynamic power transmitting device includes, further, at least a second controlling bladed wheel; means connected to said second controlling bladed wheel to cause shifting from second to first forward drive in response to engagement of said means for completing the first power train after said second controlling bladed wheel has attained a predetermined relative speed with respect to another element of the transmission.

25. A variable-speed power transmission according to claim 23, wherein the control means further includes a source of fluid pressure; and a valve having two principal positions, each of which is under the control of a respective one of the bladed wheels, one of said positions providing a connection between said source of fluid pressure and said clutch and braking means to complete the first forward drive power train and the other of said positions blocking flow through the valve to thereby complete the second forward drive power train.

26. A variable-speed power transmission according to claim 24, wherein at least one of the bladed wheels is a reactor.

27. A variable-speed power transmission according to claim 24, wherein the control means further includes
electrical means, operable when actuated to simultaneously operate the clutch and braking means to complete the first forward power train; and
an electric circuit controlled by one of the bladed wheels to actuate the electrical means and controlled by the other bladed wheel to de-actuate the electrical means, to thereby complete the second forward power train.

28. A variable-speed power transmission according to claim 24, wherein the control means further includes a source of fluid pressure; and a valve having two principal positions, each of which is under the control of a respective one of the bladed wheels, one of said positions providing a connection between said source of fluid pressure and said clutch and braking means to complete the first forward drive power train and the other of said positions blocking flow through the valve to thereby complete the second forward drive power train.

References Cited
UNITED STATES PATENTS 2,969,694  1/1961  Harmon et al. _____ 74—688
3,238,814  3/1966  Jandasek _____ 74—677

CARLTON R. CROYLE, *Primary Examiner.*

ALLAN D. HERRMANN, *Assistant Examiner.*

U.S. Cl. X.R.

74—688, 752